(12) United States Patent  
Mahurkar et al.

(10) Patent No.: US 11,747,232 B2
(45) Date of Patent: Sep. 5, 2023

(54) BAROMETRIC SENSOR CALIBRATION AND ALTITUDE DETERMINATION

(71) Applicant: Verizon Patent and Licensing Inc., Basking Ridge, NJ (US)

(72) Inventors: Sagar Deepak Mahurkar, Frisco, TX (US); Jerry Gamble, Jr., Grapevine, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 80 days.

(21) Appl. No.: 17/144,563

(22) Filed: Jan. 8, 2021

(65) Prior Publication Data

US 2022/0221365 A1 Jul. 14, 2022

(51) Int. Cl.
*G01L 27/00* (2006.01)
*G01L 19/00* (2006.01)
(Continued)

(52) U.S. Cl.
CPC .............. *G01L 27/005* (2013.01); *G01C 5/06* (2013.01); *G01C 25/00* (2013.01); *G01L 19/0092* (2013.01); *G01L 27/002* (2013.01); *A63B 2220/73* (2013.01); *A63B 2220/74* (2013.01); *H04M 2250/12* (2013.01)

(58) Field of Classification Search
CPC . G01L 27/005; G01L 19/0092; G01L 27/002; G01C 5/06; G01C 25/00; A63B 2220/73; A63B 2220/74; H04M 2250/12
See application file for complete search history.

(56) References Cited

U.S. PATENT DOCUMENTS

2014/0012529 A1* 1/2014 Lee .......................... G01C 5/06  
    702/94  
2016/0047649 A1* 2/2016 Edge ....................... H04B 1/40  
    73/384  
(Continued)

FOREIGN PATENT DOCUMENTS

WO    WO-2017173535 A1 * 10/2017 ............. G01C 25/00

OTHER PUBLICATIONS

Ye, et al., "HiMeter: Telling You the Height Rather than the Altitude", Published May 25, 2018, 20 pages, www.mdpi.com/journal/sensors, Sensors 2018, 18, 1712; doi:10.3390/s18061712.

*Primary Examiner* — Ryan D Walsh

(57) ABSTRACT

One or more computing devices, systems, and/or methods for calibrating barometric sensors and/or determining altitudes of devices are provided. In an example, a device is determined to be outdoors. In response to determining that the device is outdoors, a calibration process associated with a barometric sensor of the device is performed. The calibration process includes performing one or more barometric measurements using the barometric sensor to determine one or more barometric pressure measures, determining one or more locations of the device, wherein the one or more locations are associated with the one or more barometric measurements, and determining a barometric offset based upon the one or more barometric pressure measures and one or more reference values. An adjusted barometric pressure and/or an altitude of the device is determined based upon a first barometric pressure measure and the barometric offset.

20 Claims, 14 Drawing Sheets

(51) Int. Cl.
  *G01C 5/06*    (2006.01)
  *G01C 25/00*   (2006.01)

(56) References Cited

U.S. PATENT DOCUMENTS

| | | | |
|---|---|---|---|
| 2016/0102995 A1* | 4/2016 | Gum | G01C 25/00 702/98 |
| 2016/0245716 A1* | 8/2016 | Gum | G01L 27/002 |
| 2017/0075037 A1* | 3/2017 | Springer | H04W 48/16 |
| 2017/0205232 A1* | 7/2017 | Shirai | G01S 19/42 |

* cited by examiner

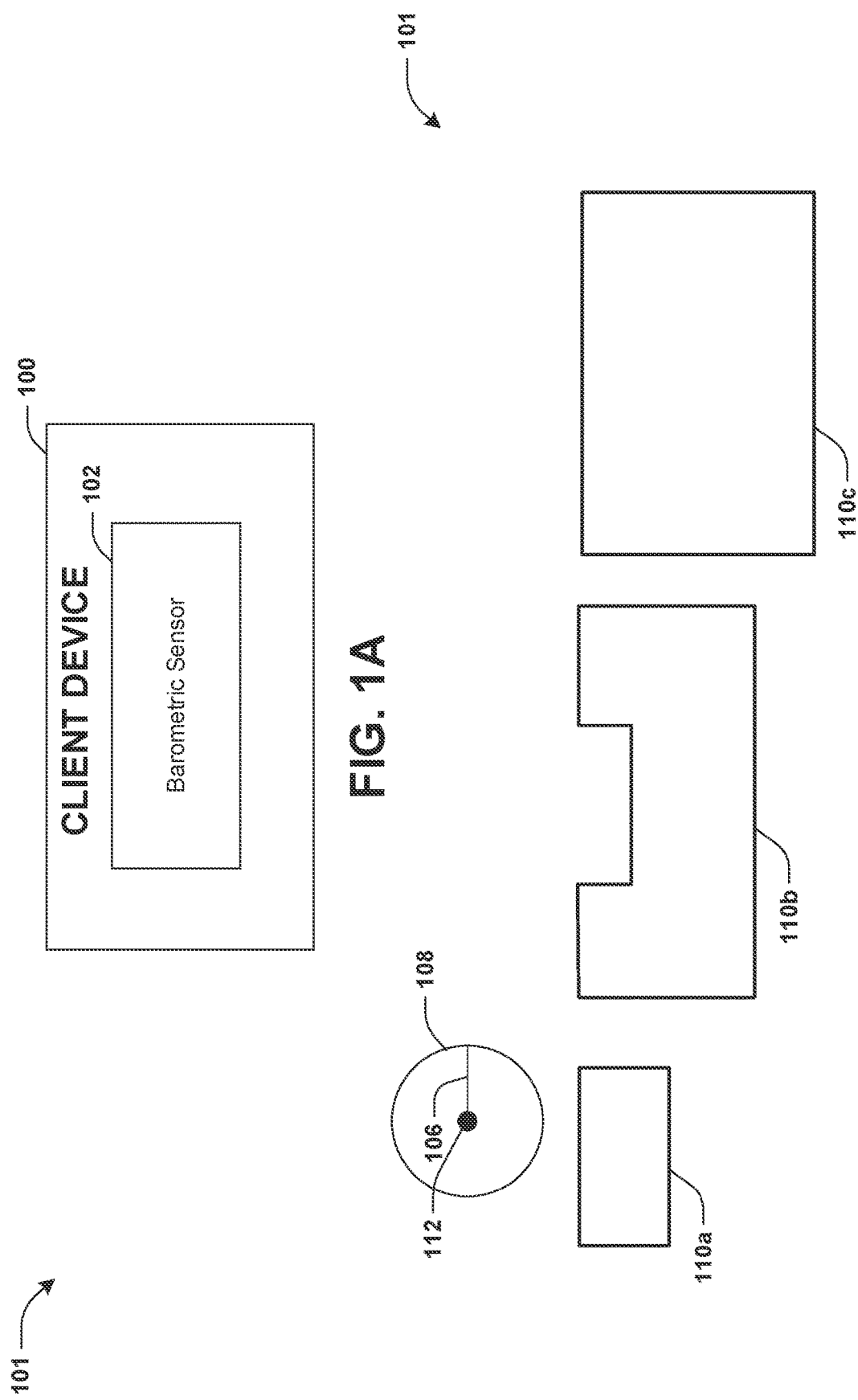

BAROMETRIC SENSOR CALIBRATION AND ALTITUDE DETERMINATION

BACKGROUND

A device may include a barometric sensor used to perform barometric measurements and determine barometric pressures. A barometric pressure may be used to determine an altitude of the device. However, the barometric pressure determined using the barometric sensor of the device may be inaccurate, and thus, the altitude may be inaccurate as well.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 1A is a diagram illustrating a first client device, of an example system for calibrating barometric sensors and/or determining altitudes of devices, according to some embodiments.

FIG. 1B is a diagram illustrating an example system for calibrating barometric sensors and/or determining altitudes of devices, where a first location of a first client device is determined and/or compared with one or more polygons according to some embodiments.

DETAILED DESCRIPTION OF EXAMPLE EMBODIMENTS

Figure 1C:
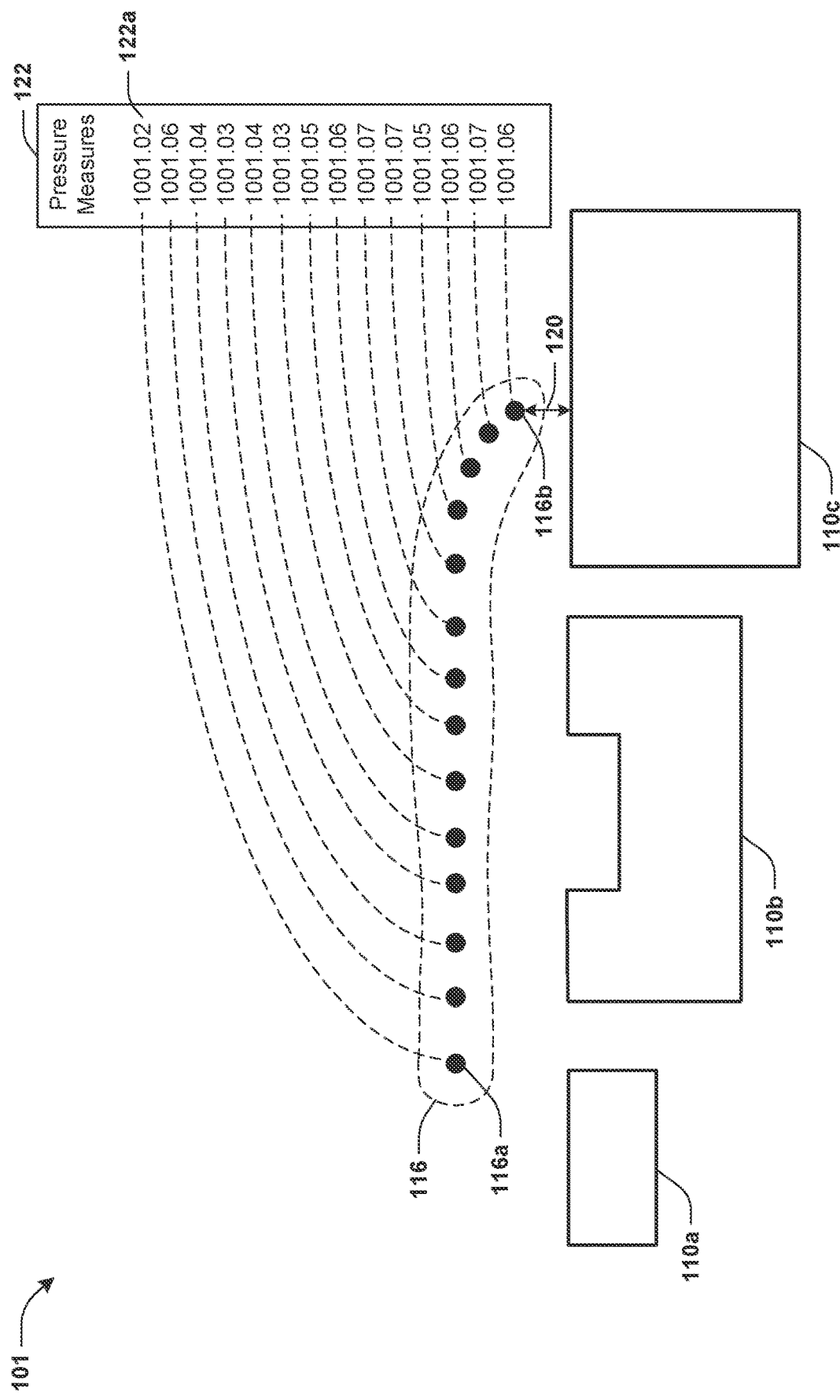
FIG. 1C is a diagram illustrating an example system for calibrating barometric sensors and/or determining altitudes of devices, where a first plurality of locations of a first client device and/or a first plurality of barometric pressure measures are determined via a first calibration process according to some embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for calibrating barometric sensors and/or determining altitudes of devices are provided. In some examples, a client device may comprise a barometric sensor. The client device may perform a barometric measurement using the barometric sensor to determine a barometric pressure measure. An altitude may be determined based upon the barometric pressure measure. However, barometric pressure measures determined using the barometric sensor of the client device may be inaccurate, such as due to at least one of bias, skew, error, etc. of the barometric sensor. Accordingly, the altitude determined based upon the barometric pressure measure may be inaccurate. The inaccuracy of the altitude may result in the altitude not being used to perform one or more useful functions, such as tracking a location of the client device and/or performing a rescue operation associated with an emergency event. Alternatively and/or additionally, one or more functions may be incorrectly performed due to the altitude being inaccurate. In an example, the altitude may be indicative of the client device being on a first floor of a building, whereas the client device may be on a second (different) floor of the building. In an exemplary scenario in which a first responder is tasked with assisting a user of the client device, due to the inaccuracy of the altitude, the first responder may be provided with incorrect information indicating that the client device (and/or the user) are on the first floor, which may cause a delay in the first responder reaching and/or assisting the user (such as due to the user and/or the client device actually being on the second floor rather than the first floor).

Accordingly, as provided herein, a calibration process to determine a barometric offset of the barometric sensor may be performed. In some examples, the calibration process may be performed responsive to a determination that one or more conditions are met. The one or more conditions may comprise a first condition that a second barometric offset (e.g., a previously determined barometric offset) is invalid, a second condition that the client device is outdoors, a third condition that a speed of the client device is less than a first threshold speed, and/or a fourth condition that the speed exceeds a second threshold speed.

In some examples, the calibration process may comprise determining barometric pressure measures using the barometric sensor. Locations of the client device, associated with the barometric pressure measures, may be determined. In some examples, during the calibration process, the client device may determine (periodically, for example) whether the client device is indoors and/or whether the client device is entering an indoor space. Alternatively and/or additionally, during the calibration process, the client device may determine (periodically, for example) one or more first distances between one or more locations of the first client device 100 and one or more polygons associated with indoor space (and/or one or more second distances between one or more locations of the first client device 100 and one or more locations of one or more building entrances). In response to determining that the client device is indoors, that the client device is entering an indoor space and/or that a distance of the one or more first distances and/or the one or more second distances is smaller than a threshold distance, the client device may select one or more barometric pressure measures (determined during the calibration process) for use in determining the barometric offset.

The one or more barometric pressure measures may be selected based upon locations of the client device determined during the calibration process. In an example, one or more locations may be identified based upon a determination that, among locations having a distance to the polygon larger than a threshold distance, the one or more locations are closest to the polygon. The one or more barometric pressure measures may be selected based upon a determination that the one or more barometric pressure measures are associated with the one or more locations.

In some examples, the barometric offset may be determined based upon the one or more barometric pressure measures and/or one or more reference values (e.g., one or more reference pressure values and/or one or more reference sea level altitude values) associated with the one or more locations. A barometric measurement may be performed using the barometric sensor to determine a barometric pressure measure. An adjusted barometric pressure measure may be determined based upon the barometric pressure measure and the barometric offset. An altitude of the client device may be determined based upon the adjusted barometric pressure measure. In some examples, by determining the altitude of the client device using the adjusted barometric pressure measure that accounts for the barometric offset, the altitude may be determined more accurately (as compared to determining the altitude using the barometric pressure measure determined via the barometric measurement without accounting for the barometric offset).

Reporting information comprising the altitude, the adjusted barometric pressure measure and/or a location of the client device may be transmitted to a location tracking system. The location tracking system may determine locating information based upon the reporting information. The locating information may be used to locate the client device. For example, the locating information may be indicative of at least one of a building in which the client device is located, a floor of the building on which the client device is located, a part of the floor in which the client device is located, etc. The locating information may be presented via an interface and/or transmitted to one or more devices, such as at least one of the client device, a first responder management device, one or more other devices, etc.

FIGS. 1A-1J illustrate examples of a system 101 for calibrating barometric sensors and/or determining altitudes of devices. FIG. 1A illustrates a first client device 100 (e.g., a phone, a laptop, a computer, a wearable device, a smart device, a television, any other type of computing device, hardware, etc.), according to some example embodiments. The first client device 100 may comprise a barometric sensor 102. The first client device 100 may use the barometric sensor 102 to perform barometric measurements to determine barometric pressure measures. A barometric pressure measure may be used for determining an altitude of the first client device 100, such as a vertical distance between the first client device 100 and a reference point, such as ground level, sea level, or other reference point. Using one or more of the techniques and/or devices herein, the barometric sensor 102 may be calibrated to determine a barometric offset associated with barometric measurement using the barometric sensor 102. The barometric offset and one or more barometric pressure measures determined using the barometric sensor 102 (and/or other information) are used to more accurately determine an altitude of the first client device 100 (as compared to determining the altitude without calibrating the barometric sensor 102 and/or without the barometric offset).

Figure 1D:
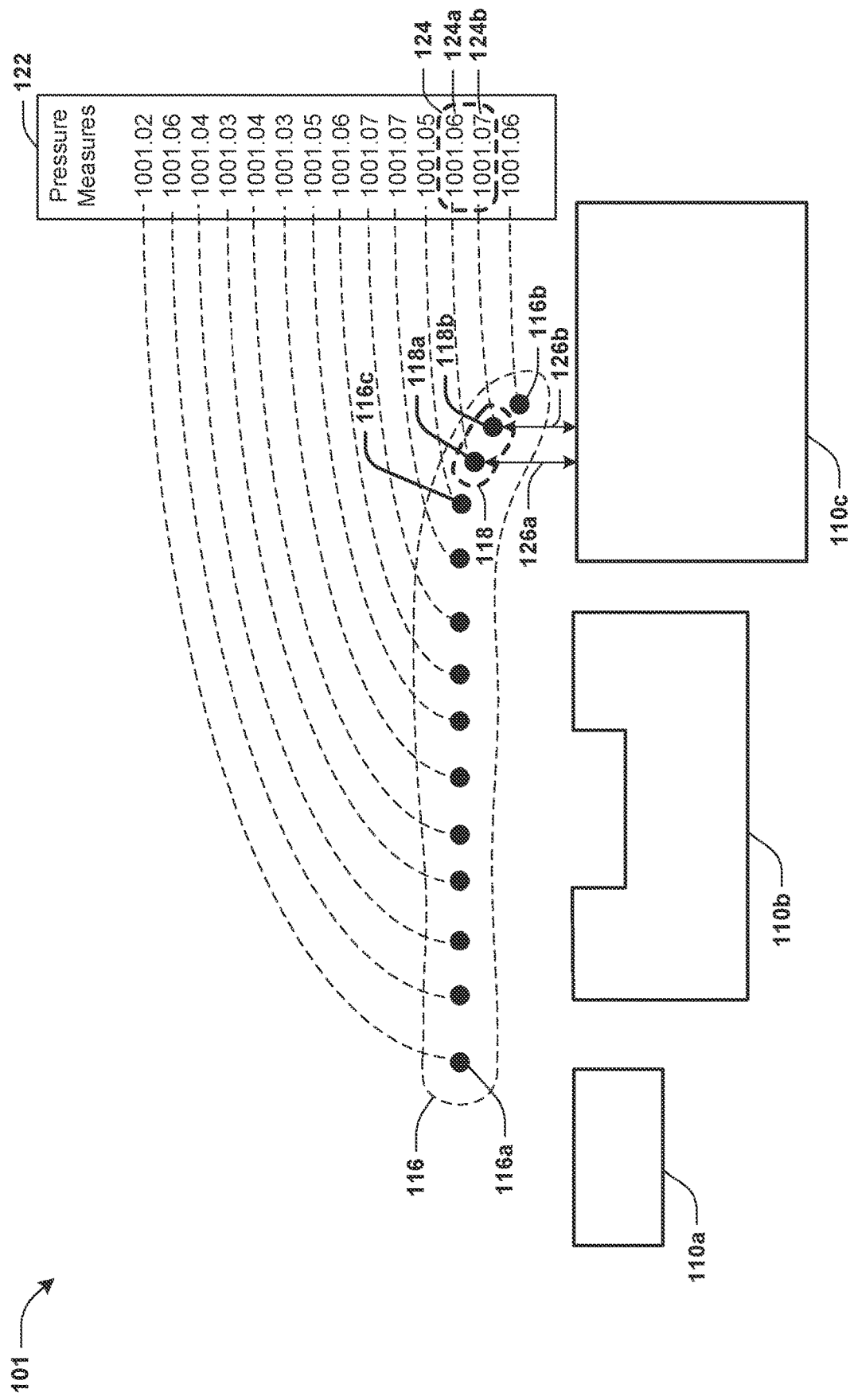
FIG. 1D is a diagram illustrating an example system for calibrating barometric sensors and/or determining altitudes of devices, where one or more first locations of a first client device and/or one or more first barometric pressure measures are identified according to some embodiments.
Figure 1E:
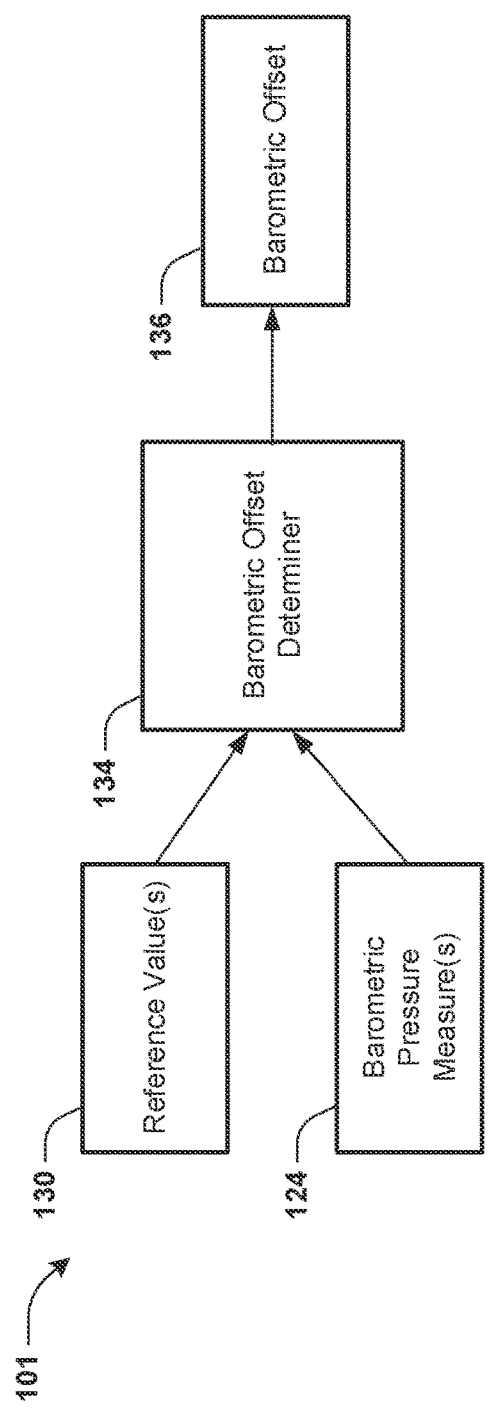
FIG. 1E is a diagram illustrating an example system for calibrating barometric sensors and/or determining altitudes of devices, where a first barometric offset is determined according to some embodiments.
Figure 1F:
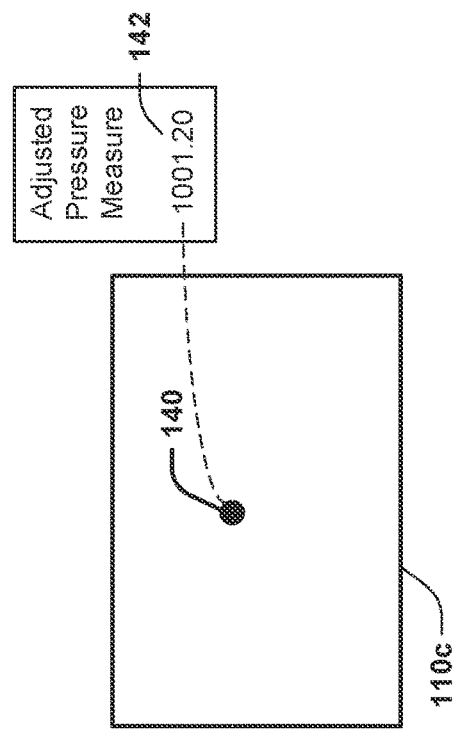
FIG. 1F is a diagram illustrating an example system for calibrating barometric sensors and/or determining altitudes of devices, where a third location of a first client device and/or an adjusted barometric pressure measure are determined according to some embodiments.
Figure 1F:
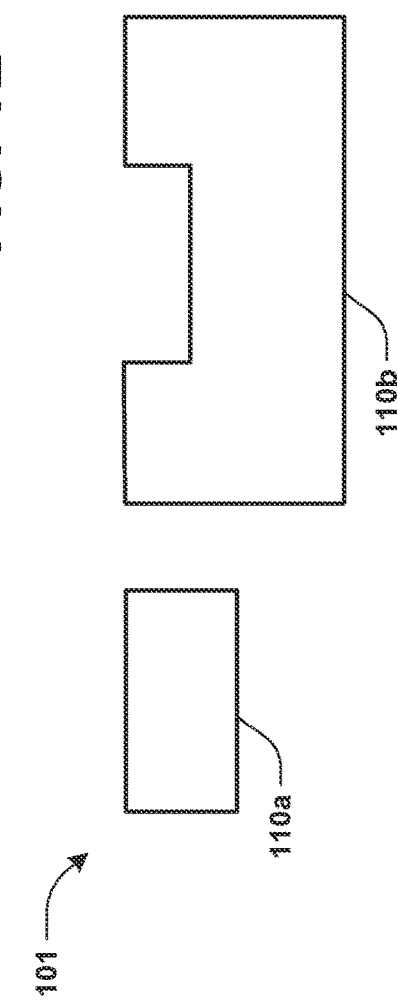
Figure 1G:
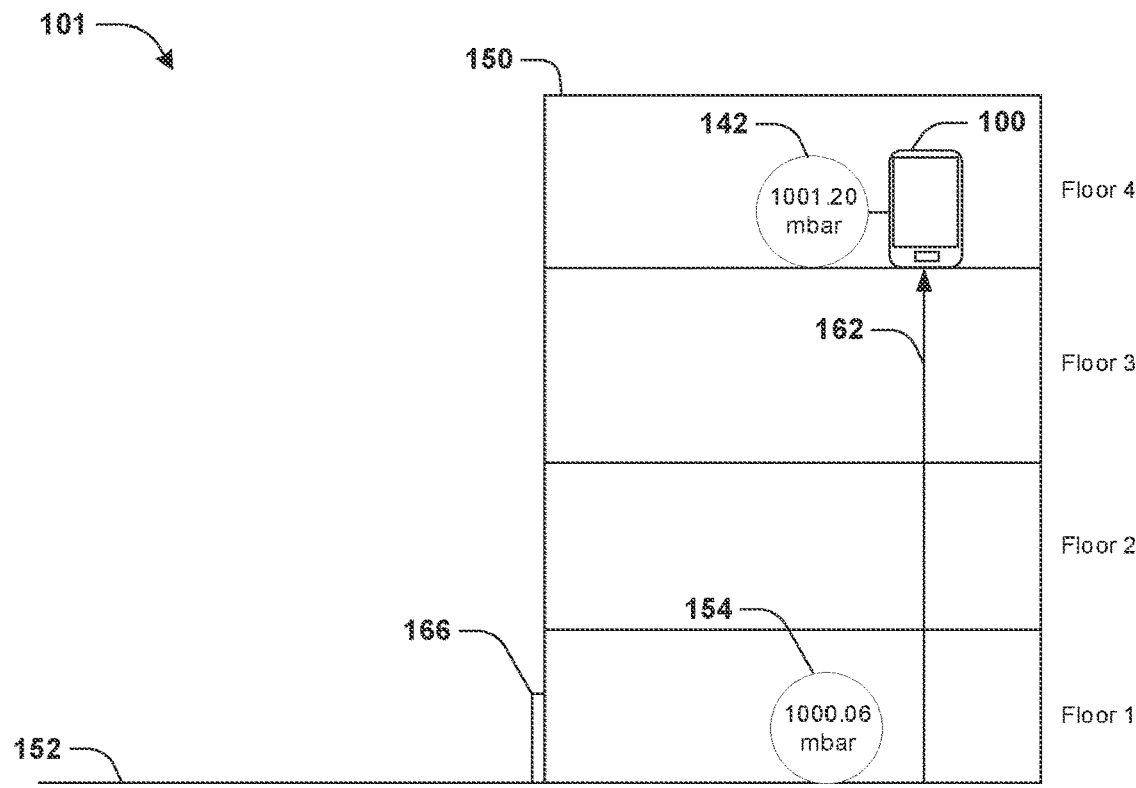
FIG. 1G is a diagram illustrating an example system for calibrating barometric sensors and/or determining altitudes of devices, where an altitude of a first client device is determined according to some embodiments.
Figure 1H:
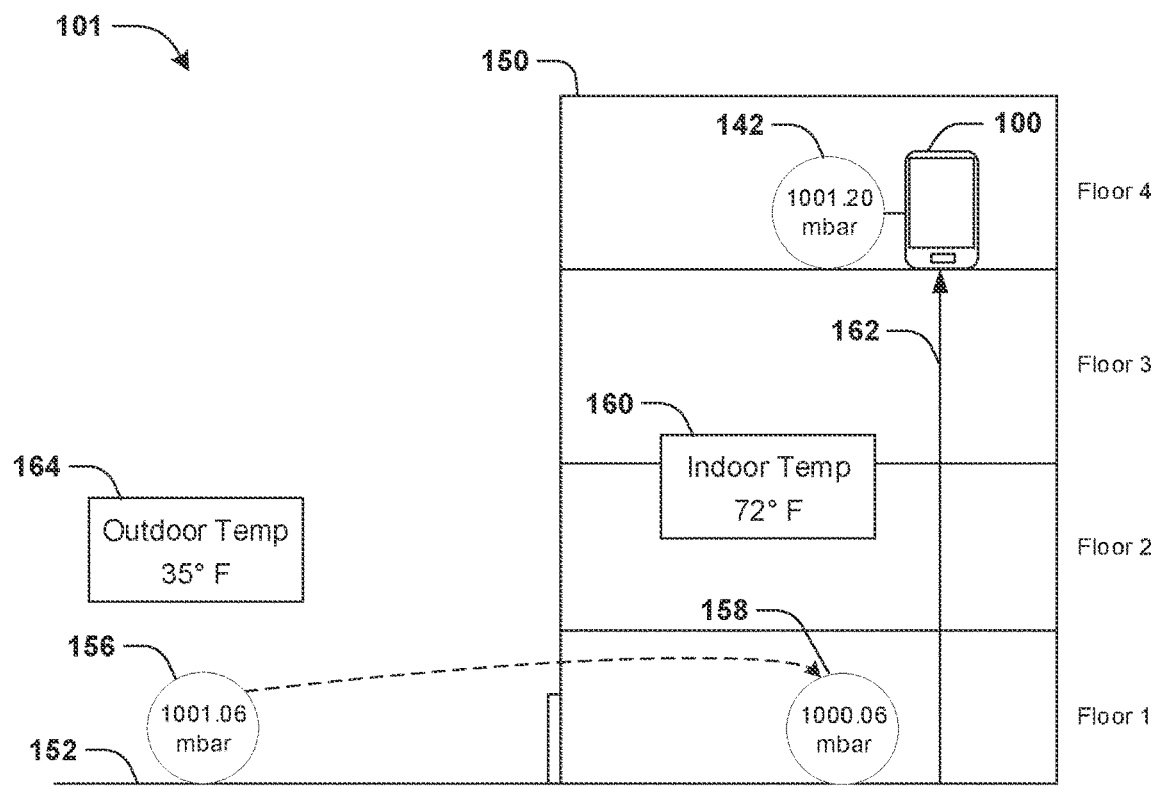
FIG. 1H is a diagram illustrating an example system for calibrating barometric sensors and/or determining altitudes of devices, where an altitude of a first client device is determined according to some embodiments.
Figure 1I:
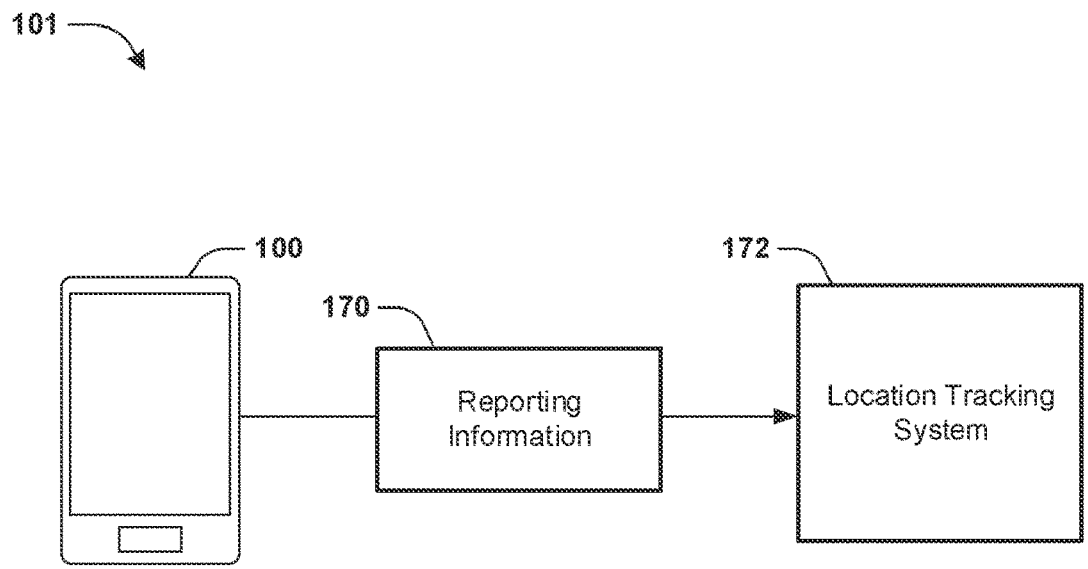
FIG. 1I is a diagram illustrating an example system for calibrating barometric sensors and/or determining altitudes of devices, where a first client device transmits reporting information to a location tracking system according to some embodiments.
Figure 1J:
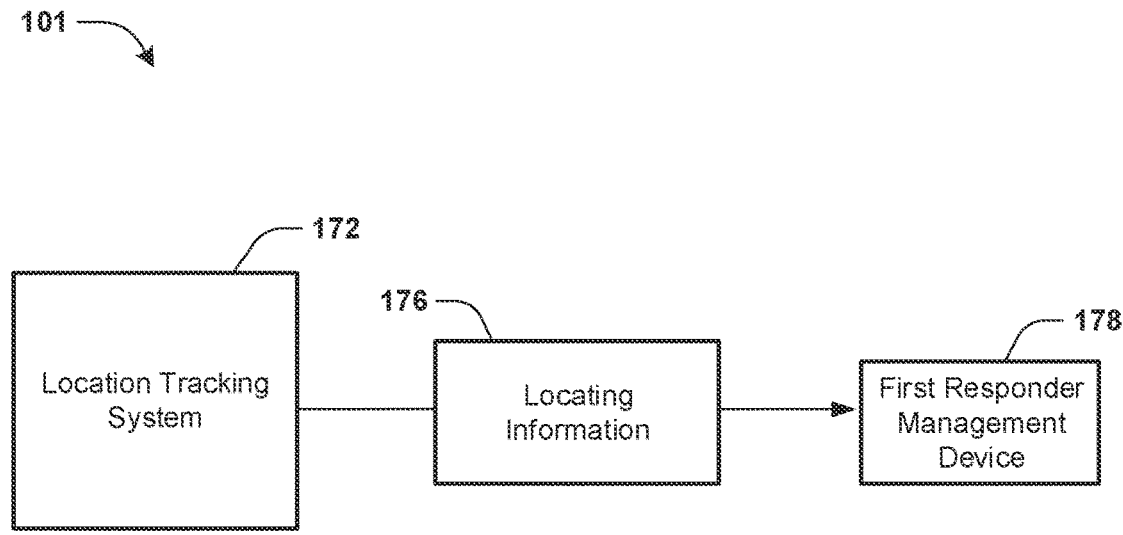
FIG. 1J is a diagram illustrating an example system for calibrating barometric sensors and/or determining altitudes of devices, where a location tracking system transmits locating information to a first responder management device according to some embodiments.
Figure 2:
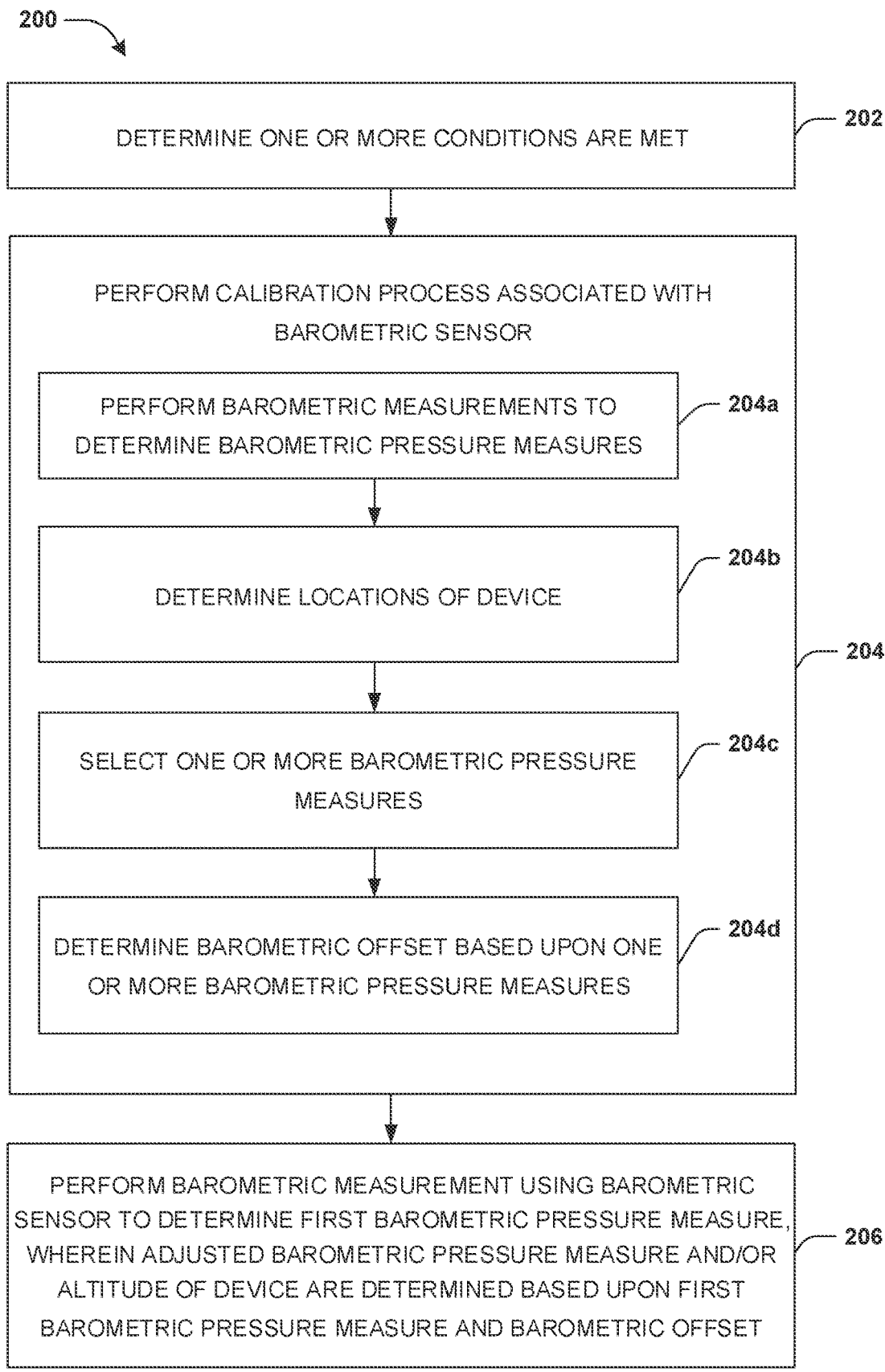
FIG. 2 is a flow chart illustrating an example method for calibrating barometric sensors and/or determining altitudes of devices according to some embodiments.
Figure 3A:
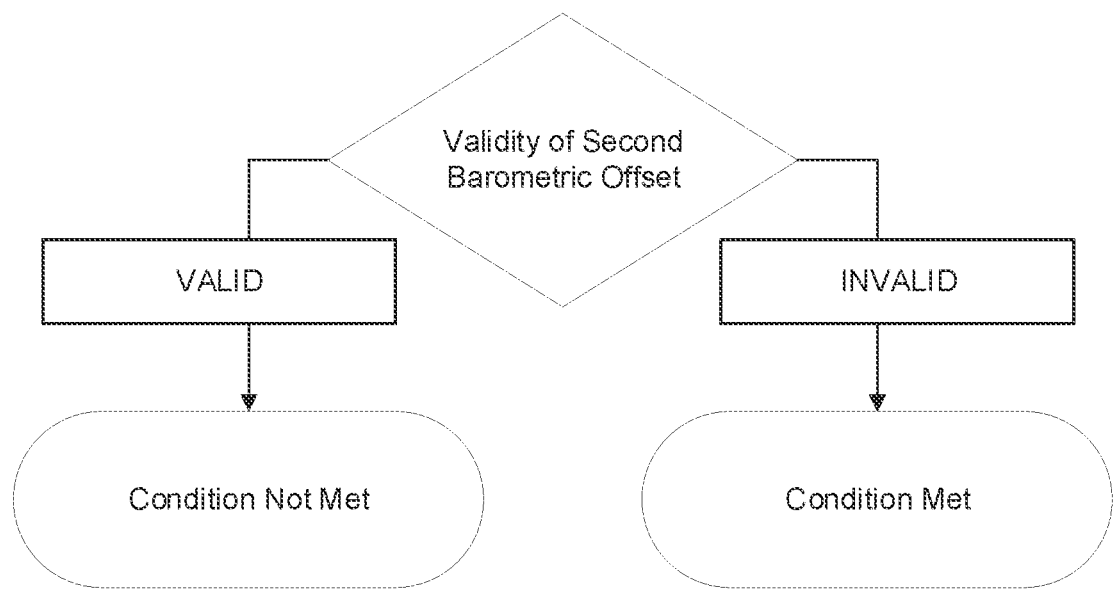
FIG. 3A is a diagram illustrating an example of determining whether a condition for performing a calibration process is met, according to some embodiments.
Figure 3B:
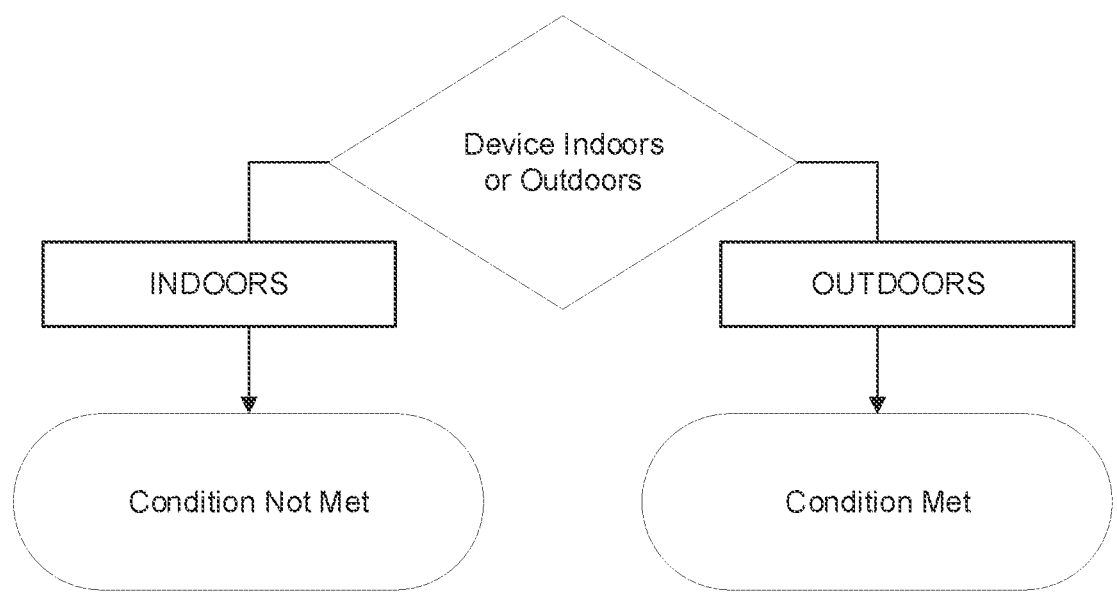
FIG. 3B is a diagram illustrating an example of determining whether a condition for performing a calibration process is met, according to some embodiments.
Figure 3C:
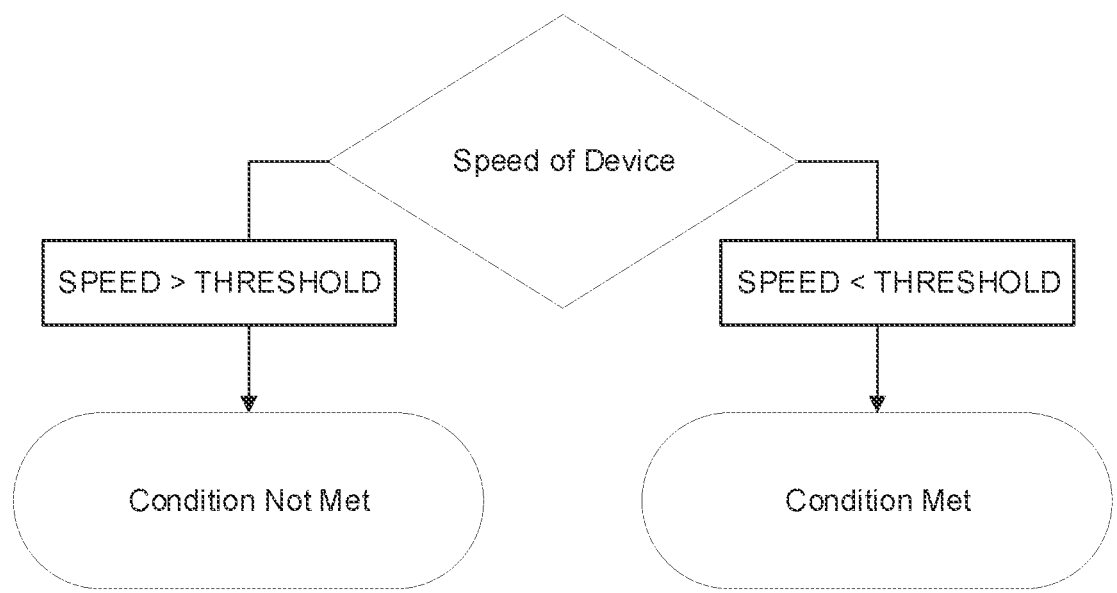
FIG. 3C is a diagram illustrating an example of determining whether a condition for performing a calibration process is met, according to some embodiments.

An embodiment of calibrating barometric sensors and/or determining altitudes of devices is illustrated by an exemplary method 200 of FIG. 2, and is further described in conjunction with the system 101 of FIGS. 1A-1J. At 202, it may be determined that one or more first conditions, for performing a first calibration process associated with the barometric sensor 102, are met. In some examples, in response to determining that the one or more first conditions are met, the first calibration process may be performed to determine a first barometric offset associated with the barometric sensor 102. Examples of determining whether exemplary conditions of the one or more first conditions are met are illustrated in FIGS. 3A-3C.

In some examples, the one or more first conditions may comprise a first condition associated with a validity of a second barometric offset determined by performing a second calibration process associated with the barometric sensor 102. An example of determining whether the first condition is met is illustrated in FIG. 3A. In some examples, it may be determined that the first condition is met based upon a determination that the second barometric offset is invalid. Alternatively and/or additionally, it may be determined that the first condition is not met based upon a determination that the second barometric offset is valid. In some examples, the second barometric offset corresponds to a barometric offset previously determined by performing (using the first client device 100, for example) the second calibration process. For example, the second barometric offset may correspond to a most recently determined barometric offset of one or more barometric offsets determined by the first client device 100 (and/or the second calibration process may correspond to a most recently performed successful calibration process of one or more calibration processes performed by the first client device 100). In some examples, the second barometric offset may be stored in a barometric offset buffer (e.g., a fixed size buffer). For example, the second barometric offset may be stored in the barometric offset buffer in response to determining the second barometric offset.

In some examples, the validity of the second barometric offset may be determined based upon a first time at which the second calibration process is performed (and/or at which the second barometric offset is determined). For example, it may be determined that the second barometric offset is invalid (and the first condition is met, for example) based upon a determination that a duration of time between the first time and a second time exceeds a threshold duration of time. The second time may correspond to a current time and/or a time at which the validity of the second barometric offset is determined. For example, the duration of time exceeding the threshold duration of time may be indicative of the second barometric offset being outdated at the second time (e.g., the current time), such as due to at least one of bias, skew, error, etc. of the barometric sensor 102 changing over time.

In some examples, the validity of the second barometric offset may be determined based upon a first location 112 (illustrated in FIG. 1B) of the first client device 100 and a second location of the first client device 102 when the second calibration process is performed (and/or when the second barometric offset is determined). For example, it may be determined that the second barometric offset is invalid (and the first condition is met, for example) based upon a determination that a distance between the second location and the first location 112 is larger than a threshold distance.

In some examples, the first location 112 (illustrated in FIG. 1B) of the first client device 100 may be determined using satellite navigation information. For example, the satellite navigation information may be determined by a satellite navigation system, such as a global navigation satellite system (GNSS) (e.g., Global Positioning System (GPS), Global Navigation Satellite System (GLONASS), Galileo, etc.). Alternatively and/or additionally, the first location 112 may be determined using received signal strength indicators (RSSIs) associated with communications between the client device and a wireless network (e.g., a WiFi network, a hotspot, a wireless access point (WAP), a network associated with a base station, etc.). Alternatively and/or additionally, the first location 112 may be determined using angle of arrival (AoA) information (e.g., one or more RSSI localization techniques and/or one or more trilateration techniques may be performed using the RSSIs and/or the AoA information to determine the first location 112).

In some examples, the one or more first conditions may comprise a second condition associated with whether the first client device 100 is indoors or outdoors. An example of determining whether the second condition is met is illustrated in FIG. 3B. In some examples, it may be determined that the second condition is met based upon a determination that the first client device 100 is outdoors. Alternatively and/or additionally, it may be determined that the second condition is not met based upon a determination that the first client device 100 is indoors. In some examples, a calibration process may be performed more accurately (and/or a more accurate barometric offset may be determined) using one or more barometric pressure measures determined using the barometric sensor 102 when the first client device 100 is outdoors, as compared to using one or more barometric pressure measures determined using the barometric sensor 102 when the first client device 100 is indoors.

In some examples, whether the first client device 100 is indoors or outdoors may be determined based upon the first location 112 of the first client device 100. Alternatively and/or additionally, whether the first client device 100 is indoors or outdoors may be determined using geographic information system (GIS) data. For example, the GIS data may comprise first polygon information associated with a first region comprising the first location 112. The first polygon information may be indicative of one or more first polygons 110 (illustrated in FIG. 1B) in the first region. A polygon of the one or more first polygons 110 may comprise a representation (e.g., a geometrical representation) of geographical boundaries of an area comprising indoor space, such as geographical boundaries of a building and/or a property containing a building.

In some examples, the first client device 100 may determine whether the first polygon information associated with the first region is stored on the first client device 100. For example, the first client device 100 may analyze a polygon information cache of the first client device 100 to determine whether the first polygon information is stored in the polygon information cache. In an example in which the first polygon information is stored on the first client device 100 (e.g., in the polygon information cache), GIS data comprising the first polygon information may have previously been received and/or stored by the first client device 100. For example, responsive to receiving GIS data from one or more GIS devices (e.g., one or more devices configured to provide GIS data to one or more client devices), the first client device 100 may store polygon information indicated by the GIS data (e.g., the polygon information may be stored in a polygon information cache of the first client device 100). In some examples, polygon information stored on the first client device 100 may be removed based upon a determination that the first client device 100 has not used the polygon information for a threshold duration of time. Alternatively and/or additionally, polygon information stored on the first client device 100 may be removed (and/or replaced with updated polygon information) based upon a determination that the polygon information was received more than a threshold duration of time before a current time and/or a determination that at least some of the polygon information may be inaccurate.

In some examples, the first client device 100 may determine that the first polygon information associated with the first region is not stored on the first client device 100 (e.g., the first client device 100 may determine that the polygon information cache does not comprise the first polygon information associated with the first region). In response to determining that the first polygon information is not stored on the first client device 100, the first client device 100 may transmit, to one or more GIS devices, a request for the first polygon information associated with the first region. In an example, the request for the first polygon information may be indicative of the first location 112, a radius and/or one or more dimensions associated with the first region. For example, a GIS device may provide the first polygon information associated with the first region based upon the first location 112, the radius and/or the one or more dimensions. In an example, the first polygon information may be indicative of polygons within the radius of the first location 112. For example, the first region may comprise an area having the radius, wherein a center of the area is based upon the first location 112. Alternatively and/or additionally, the first region may comprise an area, having the one or more dimensions (e.g., a 1 kilometer by 1 kilometer area), comprising the first location 112 (such as where a center of the first region is the first location 112). The first client device 100 may receive the first polygon information (from one or more GIS devices, for example). In some examples, the first client device 100 may use the first polygon information (received from the one or more GIS devices, for example) to determine whether the first client device 100 is indoors or outdoors. Alternatively and/or additionally, in response to receiving the first polygon information, the first client device 100 may store the first polygon information (the first polygon information may be stored in the polygon information cache for later use, for example).

Alternatively and/or additionally, in response to determining that the first polygon information is stored on the first client device 100, the first client device 100 may not transmit the request for the first polygon information. In some examples, the first client device 100 may use the first polygon information (stored on the first client device 100, for example) to determine whether the first client device 100 is indoors or outdoors. It may be appreciated that storing polygon information received from one or more GIS devices, and later using the polygon information stored on the first client device 100 to determine whether the first client device 100 is indoors or outdoors (and/or to determine other information) may provide for a reduction in power consumption (such as due to fewer transmissions of requests for polygon information and/or fewer receptions of polygon information).

In some examples, the one or more first polygons 110 (comprising polygons 110a, 110b and/or 110c illustrated in FIG. 1B, for example) in the first region may be identified based upon the first polygon information. In some examples, the one or more first polygons 110 may correspond to areas associated with indoor space. An indoor space may correspond to a space within which objects and/or people may be considered indoors (e.g., a house, an office building, other types of buildings, etc.). For example, a polygon of the one or more first polygons 110 may define geographical boundaries of an area (e.g., a property) comprising a space that is fully or partially enclosed by a structure (e.g., a structure, such as a building, comprising a roof, one or more walls and/or one or more other structural elements). The first location 112 of the first client device 100 may be compared with one or more polygons of the one or more first polygons 110. Whether the first client device 100 is indoors or outdoors may be determined based upon the comparison of the first location 112 with the one or more polygons. In an example, such as shown in FIG. 1B, it may be determined that the first client device 100 is outdoors based upon a determination that a distance between the first location 112 and a polygon (e.g., any polygon of the one or more first polygons 110) is larger than a first threshold distance 106. For example, an area 108 having a radius corresponding to the threshold distance 106 and having a center corresponding to the first location 112 does not overlap with a polygon (e.g., any polygon) of the one or more first polygons 110. In some examples, the first threshold distance 106 may be the same as and/or based upon a location error associated with the first client device 100 (e.g., the location error may be associated with a location accuracy with which locations, such as the first location 112, of the first client device 100 are determined). In some examples, the location error (e.g., a maximum location error) may correspond to a distance (e.g., a maximum distance) between an actual location of the first client device 100 and a determined location of the first client device 100. For example, one or more operations (e.g., mathematical operations) may be performed using the location error (and/or one or more other values) to determine the first threshold distance 106. By accounting for the location error associated with the first client device 100 for determining whether the first client device 100 is outdoors or indoors, a determination that the first client device 100 is outdoors is more likely to be correct as compared to determining whether the first client device is outdoors or indoors without accounting for the location error.

In some examples, the first polygon information may comprise one or more second polygons corresponding to entities other than areas associated with indoor space, such as at least one of roads, parks, landmarks, trails, etc. associated with outdoor space. In some examples, it may be determined that the first client device 100 is outdoors based upon a determination that the first location 112 is within a polygon of the one or more second polygons associated with outdoor space. In some examples, the first client device 100 may be considered to be outdoors if the first client device 100 is not enclosed (e.g., fully or partially enclosed) by a structure comprising at least one of one or more walls, a roof, etc.

In some examples, whether the first client device 100 is indoors or outdoors may be determined based upon a location change over time of the first client device 100. In some examples, it may be determined that the first client device 100 is indoors based upon a determination that the location change over time is smaller than a threshold location change. Alternatively and/or additionally, it may be determined that the first client device 100 is outdoors based upon a determination that the location change over time is larger than the threshold location change. In some examples, the location change over time may be determined based upon locations (comprising the first location 112, for example) of the first client device 100 within a period of time and/or based upon a distance by which a location of the first client device 100 changes during the period of time. In some examples, whether the first client device 100 is indoors or outdoors may be determined based upon the location change over time if it is determined that the first client device 100 is undergoing a type of motion, such as motion corresponding to at least one of a person walking while carrying the first client device 100, the user cycling while carrying the first client device 100, etc.

In some examples, the one or more first conditions may comprise a third condition associated with a speed of the first client device 100. An example of determining whether the third condition is met is illustrated in FIG. 3C. In some examples, it may be determined that the third condition is met based upon a determination that the speed is less than a first threshold speed. Alternatively and/or additionally, it may be determined that the third condition is not met based upon a determination that the speed is greater than the first threshold speed. For example, the speed of the first client device 100 exceeding the first threshold speed may inhibit an effectiveness of a calibration process (e.g., a barometric offset determined via a calibration process performed when the speed of the first client device 100 exceeds the first threshold speed may not be accurate).

In some examples, the speed of the first client device 100 may be determined using an accelerometer of the first client device 100. Alternatively and/or additionally, the speed may be determined based upon locations (comprising the first location 112, for example) of the first client device 100 and/or times at which the first client device 100 is at the locations, respectively (e.g., the speed may be determined based upon a distance traveled as indicated by the locations and a duration of time, as indicated by the times, in which the distance is traveled).

In some examples, the one or more first conditions may comprise a fourth condition associated with the speed of the first client device 100. In some examples, it may be determined that the fourth condition is met based upon a determination that the speed exceeds a second threshold speed less than the first threshold speed (e.g., 3 miles-per-hour or other speed). Alternatively and/or additionally, it may be determined that the fourth condition is not met based upon a determination that the speed is less than the second threshold speed.

At 204 of FIG. 2, a first calibration process associated with the barometric sensor 102 may be performed. For example, the first calibration process may be performed responsive to a determination that the second barometric offset is invalid (e.g., the first condition is met), the first client device 100 is outdoors (e.g., the second condition is met), the speed of the first client device 100 is less than the first threshold speed (e.g., the third condition is met), and/or the speed of the first client device 100 exceeds the second threshold speed (e.g., the fourth condition is met). In some examples, the first calibration process may be performed to determine a first barometric offset associated with barometric measurement using the barometric sensor 102.

The first calibration process may comprise act 204a, act 204b, act 204c and/or act 204d. At 204a, a first plurality of barometric measurements may be performed using the barometric sensor 102 to determine a first plurality of barometric pressure measures. In some examples, the first plurality of barometric measurements may comprise one or more first barometric measurements performed to determine one or more first barometric pressure measures. The first plurality of barometric pressure measures may comprise the one or more first barometric pressure measures. In an example, the one or more first barometric measurements and/or the one or more first barometric pressure measures may be identified (using one or more of the techniques provided herein) for use in determining the first barometric offset.

At 204b, a first plurality of locations of the first client device 100 may be determined. In some examples, a location of the first plurality of locations (and/or each location of the first plurality of locations) may be associated with a barometric measurement of the first plurality of barometric measurements and/or a barometric pressure measure of the first plurality of barometric pressure measures. For example, a location of the first plurality of locations (and/or each location of the first plurality of locations) may correspond to a location, of the first client device 100, at which a barometric measurement (of the first plurality of barometric measurements) is performed to determine a barometric pressure measure of the first plurality of barometric pressure measures.

FIG. 1C illustrates an example scenario in which the first plurality of locations (shown with reference number 116 in FIG. 1C) and/or the first plurality of barometric pressure measures (shown with reference number 122 in FIG. 10) are determined via the first calibration process. Exemplary barometric pressure measures shown in FIG. 10 may be in units of millibars (mbar). In an example, a location of the first plurality of locations 116 (and/or each location of the first plurality of locations 116) may be associated with a barometric pressure measure of the first plurality of barometric pressure measures 122. An association between a location of the first plurality of locations 116 and a barometric pressure measure of the first plurality of barometric pressure measures 122 is shown with a dashed line in FIG. 10. As an example, a location 116a of the first plurality of locations 116 is associated with a barometric pressure measure 122a of the first plurality of barometric pressure measures 122 (as indicated by a dashed line in FIG. 10). For example, the location 116a may be a location at which a barometric measurement is performed using the barometric sensor 102 to determine the barometric pressure measure 122a of the first plurality of barometric pressure measures 122.

In some examples, locations of the first plurality of locations 116 and/or barometric pressure measures of the first plurality of barometric pressure measures 122 may be determined periodically. For example, the first calibration process may comprise periodically determining a barometric pressure measure of the first plurality of barometric pressure measures 122 and a location, of the first plurality of locations 116, associated with the barometric pressure measure. In some examples, in response to determining a barometric pressure measure of the first plurality of barometric pressure measures 122 and a location, of the first plurality of locations 116, associated with the barometric pressure measure, the barometric pressure measure and/or the location may be stored (in a calibration buffer, for example) for a first duration of time. For example, the barometric pressure measure and/or the location may be removed and/or deleted (from the calibration buffer, for example) upon (and/or in response to) the first duration of time passing after the barometric pressure measure and/or the location are determined. In an example, the barometric pressure measure 122a and/or the location 116a may be determined at a time t1. The first duration of time may correspond to 30 seconds (or other duration of time, such as 1 minute, 2 minutes, etc.). The barometric pressure measure 122a and/or the location 116a may be removed and/or deleted at a time t1+30 seconds. In some examples, the barometric pressure measure 122a and/or the location 116a may be removed and/or deleted at the time t1+30 seconds if the first client device 100 determines that the barometric pressure measure 122a and/or the location 116a are not to be used for determining the first barometric offset (e.g., a determination that the barometric pressure measure 122a and/or the location 116a are not to be used for determining the first barometric offset may be based upon a determination that the one or more first barometric pressure measures, selected for use in determining the first barometric offset, do not comprise the barometric pressure measure 122a).

In some examples, whether the first client device 100 is indoors and/or whether the first client device 100 is entering an indoor space associated with a polygon may be determined periodically (e.g., once per unit of time, such as every 30 seconds, every 1 minute, etc.). For example, the first client device 100 may determine whether the first client device 100 is indoors and/or whether the first client device 100 is entering an indoor space by comparing one or more locations (determined during the first calibration process, for example) of the first client device 100 with one or more polygons (corresponding to one or more buildings, for example). Alternatively and/or additionally, the first client device 100 may determine whether the first client device 100 is indoors and/or whether the first client device 100 is entering an indoor space by comparing one or more locations (determined during the first calibration process, for example) of the first client device 100 with one or more locations of one or more building entrances (e.g., one or more entrances of one or more buildings associated with one or more polygons). For example, the one or more locations of the one or more building entrances may be determined based upon polygon information stored in the polygon information cache and/or received from one or more GIS devices.

Alternatively and/or additionally, one or more distances between one or more locations of the first client device 100 and one or more polygons may be determined periodically (such as to determine whether the first client device 100 is indoors and/or whether the first client device 100 is entering an indoor space associated with a polygon). Alternatively and/or additionally, one or more distances between one or more locations of the first client device 100 and one or more locations of one or more building entrances may be determined periodically (such as to determine whether the first client device 100 is indoors and/or whether the first client device 100 is entering an indoor space associated with a polygon)

In some examples, the first client device 100 may retrieve polygon information associated with the one or more locations for at least one of determining whether the first client device 100 is indoors, determining whether the first client device 100 is entering an indoor space, determining one or more distances between one or more locations of the first client device 100 and one or more polygons, determining one or more distances between one or more locations of the first client device 100 and one or more locations of one or more building entrances, etc. In some examples, the polygon information may be retrieved from the polygon information cache.

Alternatively and/or additionally, if the polygon information is not available and/or is not stored in the polygon information cache, the first client device 100 may transmit a request for the polygon information (using one or more of the techniques provided herein).

In an example, a location 116b (of the first plurality of locations 116, for example) of the first client device 100 may be determined, such as shown in FIG. 10. It may be determined that a distance 120 between the location 116b of the first client device 100 and the polygon 110c (corresponding to a building, for example) is less than a third threshold distance. Alternatively and/or additionally, the distance 120 may correspond to a distance between the location 116b of the first client device 100 and a location of a building entrance (not shown) associated with the polygon 110c (e.g., the building entrance may correspond to an entrance of the building corresponding to the polygon 110c). For example, the distance 120 may be determined based upon the location 116b of the first client device 100 and the location of the building entrance associated with the polygon 110c.

In some examples, the third threshold distance may be the same as and/or based upon the first threshold distance 106 (and/or the location error). The distance 120 being smaller than the third threshold distance may indicate that the first client device 100 may be indoors (e.g., within the building corresponding to the polygon 110c) or outdoors (e.g., outside the building corresponding to the polygon 110c), depending upon an accuracy with which the location 116b is determined. Alternatively and/or additionally, the distance 120 being smaller than the third threshold distance may indicate that the first client device 100 is entering the building corresponding to the polygon 110c.

At 204c (of the first calibration process), the one or more first barometric pressure measures of the first plurality of barometric pressure measures 122 may be selected (for determining the first barometric offset, for example). In some examples, the one or more first barometric pressure measures may be selected (and/or the first barometric offset may be determined based upon the one or more first barometric pressure measures) in response to determining that the first client device 100 is indoors (and/or within an area (e.g., indoor space) corresponding to the polygon 110c). Alternatively and/or additionally, the one or more first barometric pressure measures may be selected (and/or the first barometric offset may be determined based upon the one or more first barometric pressure measures) in response to determining that the first client device 100 is entering the area (e.g., indoor space) corresponding to the polygon 110c. Alternatively and/or additionally, the one or more first barometric pressure measures may be selected (and/or the first barometric offset may be determined based upon the one or more first barometric pressure measures) in response to determining that the distance 120 is smaller than the third threshold distance. Alternatively and/or additionally, the one or more first barometric pressure measures may be selected (and/or the first barometric offset may be determined based upon the one or more first barometric pressure measures) in response to determining that a location (determined during the first calibration process, for example) of the first client device 100 is within the polygon 110c. Alternatively and/or additionally, the one or more first barometric pressure measures may be selected (and/or the first barometric offset may be determined based upon the one or more first barometric pressure measures) in response to determining that a location (determined during the first calibration process, for example) of the first client device 100 is within the polygon 110c and a distance between the location and an edge of the polygon 110c is larger than a threshold distance (e.g., the third threshold distance and/or other threshold distance based upon the location error).

In some examples, in response to selecting the one or more first barometric pressure measures of the first plurality of barometric pressure measures 122, the first client device 100 may stop determining locations and/or barometric pressure measures of the first calibration process (and/or the first client device 100 may stop determining locations and/or barometric pressure measures of the first calibration process when and/or before the one or more first barometric pressure measures of the first plurality of barometric pressure measures 122 are selected). Alternatively and/or additionally, the first client device 100 may not stop determining locations and/or barometric pressure measures of the first calibration process in response to selecting the one or more first barometric pressure measures of the first plurality of barometric pressure measures 122 (and/or the first client device 100 may not stop determining locations and/or barometric pressure measures of the first calibration process when and/or before the one or more first barometric pressure measures of the first plurality of barometric pressure measures 122 are selected).

In some examples, in response to determining that the first client device 100 is indoors (and/or within an area (e.g., indoor space) corresponding to the polygon 110c), a geofence corresponding to the polygon 110c may be generated (by the first client device 100, for example). In some examples, the geofence may enable the first client device 100 to automatically detect when and/or whether the first client device 100 crosses the geofence (such as by moving from inside the area corresponding to the polygon 110c to outside the area corresponding to the polygon 110c). Accordingly, prior to detection of the first client device 100 crossing the geofence, the first client device 100 may know and/or determine (without comparing a location of the first client device 100 with polygons, for example) that the first client device 100 is indoors and/or that the first client device 100 is within the area corresponding to the polygon 110c. Accordingly, prior to detection of the first client device 100 crossing the geofence, the first client device 100 may not be required to compare a location of the first client device 100 with polygons (such as for determining whether the one or more first conditions are met and/or whether to perform a third calibration process).

The one or more first barometric pressure measures may be selected based upon the first plurality of locations 116. For example, one or more first locations of the first plurality of locations 116 may be selected, and/or the one or more first barometric pressure measures may be selected based upon a determination that the one or more first barometric pressure measures are associated with the one or more first locations. In some examples, the first barometric offset is determined using the one or more first barometric pressure measures based upon the one or more first barometric pressure measures being associated with the one or more first locations.

FIG. 1D illustrates an exemplary scenario in which the one or more first locations (shown with reference number 118) and/or the one or more first barometric pressure measures (shown with reference number 124) are selected. In some examples, the one or more first locations 118 may be selected in response to determining that the first client device 100 is indoors (and/or within an area (e.g., indoor space) corresponding to the polygon 110c). Alternatively and/or additionally, the one or more first locations 118 may be selected in response to determining that the first client device 100 is entering the area (e.g., indoor space) corresponding to the polygon 110c. Alternatively and/or additionally, the one or more first locations 118 may be selected in response to determining that the distance 120 is smaller than the third threshold distance. Alternatively and/or additionally, the one or more first locations 118 may be selected in response to determining that a location (determined during the first calibration process, for example) of the first client device 100 is within the polygon 110c. Alternatively and/or additionally, the one or more first locations 118 may be selected in response to determining that a location (determined during the first calibration process, for example) of the first client device 100 is within the polygon 110c and a distance between the location and an edge of the polygon 110c is larger than a threshold distance (e.g., the third threshold distance and/or other threshold distance based upon the location error).

In some examples, a second plurality of locations may be analyzed to select the one or more first locations 118. The second plurality of locations may comprise the first plurality of locations 116. Alternatively and/or additionally, the second plurality of locations may comprise locations, of the first plurality of locations 116, that are stored in the calibration buffer. For example, the second plurality of locations may comprise locations, of the first plurality of locations 116, that are not removed and/or deleted from the calibration buffer. The one or more first locations 118 may be identified based upon a determination that one or more distances 126 (e.g., distance 126a and/or distance 126b) between the one or more first locations 118 and the polygon 110c are larger than a fourth threshold distance and are smaller than a fifth threshold distance. In some examples, the fourth threshold distance may be the same as and/or based upon the third threshold distance, the first threshold distance and/or the location error. The fifth threshold distance is larger than the fourth threshold distance. The one or more distances 126 (between the one or more first locations 118 and the polygon 110c) being larger than the fourth threshold distance may indicate that the first client device 100 is outdoors (e.g., definitively outdoors), taking the location error into account, when the one or more first locations 118 and/or the one or more first barometric pressure measures 124 are determined (and/or that the first client device 100 is outdoors, taking the location error into account, when the one or more first barometric measurements are performed to determine the one or more first barometric pressure measures 124).

In some examples, the one or more first locations 118 may comprise all locations, of the second plurality of locations, having distances to the polygon 110c that are larger than the fourth threshold distance and smaller than the fifth threshold distance. Alternatively and/or additionally, the one or more first locations 118 may comprise merely one or some locations of a set of locations of the second plurality of locations, wherein each location of the set of locations have a distance to the polygon 110c that is larger than the fourth threshold distance and smaller than the fifth threshold distance. For example, the first client device 100 may select the one or more first locations 118 by selecting one or more locations, amounting to at most a maximum number of locations, from among the set of locations. In an example in which a number of locations of the set of locations exceeds the maximum number of locations, the first client device 100 may select the one or more first locations 118 by selecting one or more locations, amounting to at most the maximum number of locations, that are closest to the polygon 110c among the set of locations.

In an exemplary scenario, the set of locations (having distances to the polygon 110c that are larger than the fourth threshold distance and smaller than the fifth threshold distance) may comprise a location 118a of the one or more first locations 118, a location 118b of the one or more first locations 118 and/or a location 116c of the second plurality of locations. The distance 126b between the location 118b and the polygon 110c may be smaller than the distance 126a between the location 118a and the polygon 110c. The distance 126a between the location 118a and the polygon 110c may be smaller than a distance between the location 116c and the polygon 110c. Thus, among the set of locations, the location 118b is closest to the polygon 110c, the location 118a is second-closest to the polygon 110c and the location 116c is third-closest to the polygon 110c.

In a first example in which the maximum number of locations is 1, the one or more first locations 118 may comprise merely the location 118b (based upon, among the set of locations, the location 118b being the closest to the polygon 110c, for example). For example, the location 118a and the location 116c may not be included in the one or more first locations 118 based upon the maximum number of locations being 1.

In a second example in which the maximum number of locations is 2, the one or more first locations 118 may comprise merely the location 118b and the location 118a (based upon, among the set of locations, the location 118b being the closest to the polygon 110c and the location 118a being the second-closest to the polygon 110c, for example).

For example, the location 116c may not be included in the one or more first locations 118 based upon the maximum number of locations being 2.

In a third example, in which the maximum number of locations is 3 (or the maximum number of locations is greater than 3), the one or more first locations 118 may comprise the location 118b, the location 118a and the location 116c (based upon, among the set of locations, the location 118b being the closest to the polygon 110c, the location 118a being the second-closest to the polygon 110c and the location 116c being the third-closest to the polygon 110c, for example). In some examples where a number of locations of the one or more first locations 118 is not limited by the maximum number of locations, other locations of the second plurality of locations may not be included in the one or more first locations 118 based upon the other locations having distances to the polygon 110c that are larger than the fifth threshold distance.

In some examples, the fifth threshold distance may not be applied to determine the one or more locations 118. For example, the first client device 100 may select the one or more first locations 118 by selecting one or more locations, amounting to at most a maximum number of locations, from among the second plurality of locations, based upon a determination that, among the second plurality of locations, the one or more first locations 118 are closest to the polygon 110c (e.g., the one or more first locations 118 may be selected based upon the one or more first locations 118 being closest to the polygon 110c among the second plurality of locations). In an example in which the maximum number of locations is 1, the one or more first locations 118 may comprise merely the location 118b (based upon, among locations the second plurality of locations with distances to the polygon 110c that are larger than the fourth threshold distance, the location 118b being the closest to the polygon 110c), regardless of whether the distance 126b between the location 118b and the polygon 110c is smaller than the fifth threshold distance. In an example in which the maximum number of locations is 2, the one or more first locations 118 may comprise merely the location 118b and the location 118a (based upon, among locations the second plurality of locations with distances to the polygon 110c that are larger than the fourth threshold distance, the location 118b being the closest to the polygon 110c and the location 118a being the second-closest to the polygon 110c), regardless of whether the distance 126b and/or the distance 126a are smaller than the fifth threshold distance.

In some examples, the one or more first barometric pressure measures 124 may be identified based upon the one or more first locations 118. For example, the one or more first barometric pressure measures 124 may be identified based upon a determination that each barometric pressure measure of the one or more first barometric pressure measures 124 is associated with a location of the one or more first locations 118 (e.g., each barometric pressure measure of the one or more first barometric pressure measures 124 is determined via a barometric measurement performed at a location of the one or more first locations 118).

At 204d (of the first calibration process), the first barometric offset associated with the barometric sensor 102 may be determined based upon the one or more first barometric pressure measures 124 and/or one or more reference values. The one or more first barometric pressure measures 124 may be used for determining the first barometric offset based upon a determination that the one or more first barometric pressure measures 124 are associated with the one or more first locations 118 (e.g., each barometric pressure measure of the one or more first barometric pressure measures 124 is determined via a barometric measurement performed at a location of the one or more first locations 118).

In some examples, as a result of the one or more distances between the one or more first locations 118 and the polygon 110c being larger than the fourth threshold distance (and/or the first client device 100 selecting the one or more first barometric pressure measures 124 associated with the one or more first locations 118), the one or more first barometric pressure measures 124 correspond to one or more measures that are determined when the first client device 100 is outdoors, such as accounting for the location error (e.g., the one or more first barometric measurements are performed to determine the one or more first barometric pressure measures 124 when the first client device is outdoors). It may be appreciated that using the one or more first barometric pressure measures 124 that are determined when the first client device 100 is outdoors provides for an increase in accuracy of the first barometric offset (determined using one or more of the techniques presented herein), as compared to determining the first barometric offset using one or more first barometric pressure measures that are determined when the first client device 100 is indoors. The increase in accuracy of the first barometric offset may be due to one or more reference values (discussed herein) used to determine the first barometric offset being associated with outdoor conditions.

Alternatively and/or additionally, by selecting the one or more first locations 118 that are closest to and/or within the fifth threshold distance of the polygon 110c, by selecting the one or more first barometric pressure measures 124 based upon the one or more first locations 118 and/or by determining the first barometric offset based upon the one or more first barometric pressure measures 124, an accuracy with which an altitude of the first client device 100 is determined based upon the first barometric offset when the first client device 100 is within a building corresponding to the polygon 110c is increased, as compared to determining the altitude based upon a barometric offset that is determined using barometric pressure measures associated with locations that are further away from the polygon 110c than the one or more first locations 118.

In some examples, the first client device 100 may determine merely the one or more first barometric pressure measures 124, that are used for determining the first barometric offset 136, during the first calibration process (rather than determining the first plurality of barometric pressure measures 122 and selecting the one or more first barometric pressure measures 124, from the first plurality of barometric pressure measures 122, for use in determining the first barometric offset 136, for example).

FIG. 1E illustrates an exemplary scenario in which the first barometric offset (shown with reference number 136 in FIG. 1E) is determined. For example, the one or more reference values (shown with reference number 130 in FIG. 1E) and/or the one or more first barometric pressure measures 124 may be input to a barometric offset determiner 134. The barometric offset determiner 134 may determine the first barometric offset 136 based upon the one or more reference values 130 and/or the one or more first barometric pressure measures 124. In an example, the first client device 100 may comprise and/or implement the barometric offset determiner 134.

In some examples, the one or more reference values 130 may comprise one or more reference pressure values associated with the one or more first locations 118. A reference pressure value of the one or more reference pressure values may be associated with a location of the one or more first locations 118. The reference pressure value may be received from one or more devices of a geographical system (e.g., a system configured to provide geographical information to one or more devices) and/or a weather system (e.g., a system configured to provide weather information to one or more devices). For example, a request for the reference pressure value may be transmitted to one or more devices of the geographical system and/or the weather system. The request may comprise an indication of the one or more first locations 118. One or more devices of the geographical system and/or the weather system may transmit information, comprising the one or more reference pressure values, based upon the one or more first locations 118. Alternatively and/or additionally, the one or more reference pressure values may be determined based upon geographical information and/or weather information. The geographical information and/or the weather information may be associated with the one or more first locations 118. For example, one or more requests for the geographical information and/or the weather information may be transmitted to one or more devices of the geographical system and/or the weather system. The one or more requests may comprise an indication of the one or more first locations 118. One or more devices of the geographical system and/or the weather system may transmit the geographical information and/or the weather information based upon the one or more first locations 118. In some examples, a barometric offset may be determined based upon the reference pressure value and a barometric pressure measure (of the one or more first barometric pressure measures 124) associated with the location. For example, one or more operations may be performed using the barometric pressure measure and the reference pressure value to determine the barometric offset. In an example, the barometric offset may correspond to and/or may be determined based upon a difference between the barometric pressure measure and the reference pressure value.

In some examples, the one or more reference values 130 may comprise one or more reference mean sea level pressure values associated with the one or more first locations 118. In an example, a reference mean sea level pressure value of the one or more reference mean sea level pressure values may be associated with a location of the one or more first locations 118 (e.g., the reference mean sea level pressure value may be indicative of a mean sea level pressure of the location). The reference mean sea level pressure value may be received from one or more devices of the geographical system and/or the weather system. Alternatively and/or additionally, the reference mean sea level pressure value may be determined based upon geographical information and/or weather information (received from one or more devices of the geographical system and/or the weather system, for example). In some examples, the geographical information may be indicative of a reference sea level altitude of the location. Alternatively and/or additionally, the weather information may comprise weather pressure associated with the location and/or a temperature associated with the location. The reference mean sea level pressure value may be determined based upon the reference sea level altitude, the weather pressure and/or the temperature.

In some examples, a barometric offset may be determined based upon the reference mean sea level pressure value and a barometric pressure measure (of the one or more first barometric pressure measures 124) associated with the location. For example, one or more operations may be performed using the barometric pressure measure and the reference mean sea level pressure value to determine the barometric offset. In an example, the barometric offset may correspond to and/or may be determined based upon a difference between the barometric pressure measure and the reference mean sea level pressure value.

Alternatively and/or additionally, a mean sea level pressure may be determined based upon the barometric pressure measure and the weather pressure, the temperature and/or the reference sea level altitude (e.g., the barometric pressure measure may be converted to the mean sea level pressure based upon the weather pressure, the temperature and/or the reference sea level altitude). The barometric offset may be determined based upon the reference mean sea level pressure value and the mean sea level pressure (that is determined based upon the barometric pressure measure). For example, one or more operations may be performed using the mean sea level pressure and the reference mean sea level pressure value to determine the barometric offset. In an example, the barometric offset may correspond to and/or may be determined based upon a difference between the mean sea level pressure and the reference mean sea level pressure value.

In some examples, the one or more reference values 130 may comprise one or more reference sea level altitude values associated with the one or more first locations 118. In an example, a reference sea level altitude value of the one or more reference sea level altitude values 130 may be associated with a location of the one or more first locations 118 (e.g., the reference sea level altitude value may be indicative of a sea level altitude of ground). The reference sea level altitude value may be received from one or more devices of the geographical system and/or the weather system. Alternatively and/or additionally, the reference sea level altitude value may be determined based upon geographical information and/or weather information (received from one or more devices of the geographical system and/or the weather system, for example). In some examples, the geographical information may be indicative of a reference sea level altitude of the location. Alternatively and/or additionally, the weather information may comprise weather pressure associated with the location and/or a temperature associated with the location. The reference sea level altitude value may be determined based upon the reference sea level altitude, the weather pressure and/or the temperature.

In some examples, a barometric offset may be determined based upon the reference sea level altitude value and a barometric pressure measure (of the one or more first barometric pressure measures 124) associated with the location. For example, one or more operations may be performed using the barometric pressure measure and the reference sea level altitude value to determine the barometric offset. In an example, a sea level altitude may be determined based upon the barometric pressure measure, the weather pressure and/or the temperature (e.g., the barometric pressure measure may be converted to the sea level altitude based upon the weather pressure and/or the temperature). The barometric offset may be determined based upon the reference sea level altitude value and the sea level altitude (that is determined based upon the barometric pressure measure). For example, one or more operations may be performed using the reference sea level altitude value and the sea level altitude to determine the barometric offset. In an example, the barometric offset may correspond to and/or may be determined based upon a difference between the reference sea level altitude value and the sea level altitude.

In some examples, the one or more reference values 130 may comprise one or more reference surface pressure values associated with the one or more first locations 118. In an example, a reference surface pressure value of the one or more reference surface pressure values may be associated with a location of the one or more first locations 118 (e.g., the reference surface pressure value may be indicative of a surface pressure of the location). The reference surface pressure value may be received from one or more devices of the geographical system and/or the weather system. Alternatively and/or additionally, the reference surface pressure value may be determined based upon weather information (received from one or more devices of the geographical system and/or the weather system, for example). The weather information may comprise weather pressure associated with the location and/or a temperature associated with the location. The reference surface pressure value may be determined based upon the weather pressure and/or the temperature.

In some examples, a barometric offset may be determined based upon the reference surface pressure value and a barometric pressure measure (of the one or more first barometric pressure measures 124) associated with the location. For example, one or more operations may be performed using the barometric pressure measure and the reference surface pressure value to determine the barometric offset. In an example, the barometric offset may correspond to and/or may be determined based upon a difference between the barometric pressure measure and the reference surface pressure value.

In an example in which the one or more first locations 118 comprise merely the location (e.g., a single location) and/or the one or more first barometric pressure measures 124 comprise merely the barometric pressure measure (e.g., a single barometric pressure measure), the first barometric offset 136 may be determined based upon the barometric offset (and/or the first barometric offset 136 may be the same as the barometric offset). In an example in which the one or more first locations 118 comprise multiple locations and/or the one or more first barometric pressure measures 124 comprise multiple barometric pressure measures, multiple barometric offsets (comprising the barometric offset) may be determined using one or more of the techniques presented herein with respect to determining the barometric offset. The first barometric offset 136 may be determined based upon the multiple barometric offsets. In an example, the multiple barometric offsets may be combined (e.g., averaged) to determine the first barometric offset 136 (e.g., the first barometric offset 136 may correspond to an average of the multiple barometric offsets).

In some examples, the first barometric offset 136 may be stored on the first client device 100, such as in the barometric offset buffer (e.g., the fixed size buffer). At 206 of FIG. 2, a first barometric measurement may be performed using the barometric sensor 102 to determine a first barometric pressure measure. Information, such as at least one of an adjusted barometric pressure measure (shown with reference number 142 in FIG. 1F), an altitude of the first client device 100, etc. may be determined (by the first client device 100, for example) based upon the first barometric pressure measure and the first barometric offset 136.

The adjusted barometric pressure measure 142 may correspond to a corrected barometric pressure measure that takes the first barometric offset 136 (associated with an error of barometric measurement of the barometric sensor 102, for example) into account. In some examples, one or more mathematical operations may be performed using the first barometric pressure measure and the first barometric offset 136 to determine the adjusted barometric pressure measure 142. For example, the first barometric offset 136 may be at least one of added to, subtracted from, multiplied by, etc. the first barometric pressure measure to determine the adjusted barometric pressure measure 142.

Alternatively and/or additionally, the adjusted barometric pressure measure 142 may be determined based upon a pressure change (e.g., pressure drift). The pressure change may correspond to a change in barometric pressure over time. The pressure change may be determined based upon a first pressure value associated with the first calibration process and/or a second pressure value associated with the first barometric measurement. The first pressure value and/or the second pressure value may correspond to outdoor barometric pressure conditions. In some examples, the first pressure value may correspond to at least one of a mean sea level pressure, a surface pressure, etc. at a time at which the first calibration process is performed and/or at a time at which the one or more first barometric measurements are performed to determine the one or more first barometric pressure measures 124. In some examples, the second pressure value may correspond to at least one of a mean sea level pressure, a surface pressure, etc. at a time at which the first barometric measurement is performed. The first pressure value and/or the second pressure value may be received from one or more devices of the geographical system and/or the weather system (such as in response to transmitting a request for the first pressure value and/or a request for the second pressure value). The first pressure value may be associated with a location at which the first calibration process is performed and/or the one or more first barometric measurements are performed to determine the one or more first barometric pressure measures 124 (e.g., the request for the first pressure value may comprise an indication of the one or more first locations 118 and/or the one or more devices may determine the first pressure value based upon the indication). The second pressure value may be associated with a location of the first client device 100 when the first barometric measurement is performed (e.g., the request for the second pressure value may comprise an indication of the location and/or the one or more devices may determine the second pressure value based upon the indication). In some examples, the first pressure value may be received, determined and/or stored during the first calibration process. For example, the first pressure value may be the same as and/or based upon a reference value (e.g., a reference pressure value) of the one or more reference values 130. For example, the first client device 100 may store the first pressure value in response to determining (e.g., receiving) the first pressure value (that is used to determine the first barometric offset 136, for example). In some examples, the pressure change may be determined based upon the first pressure value and/or the second pressure value. For example, the pressure change may correspond to and/or may be determined based upon a difference between the first pressure value and the second pressure value. The adjusted barometric pressure measure 142 may be determined based upon the first barometric pressure measure, the first barometric offset 136 and/or the pressure change. In some examples, one or more mathematical operations may be performed using the first barometric pressure measure, the first barometric offset 136 and/or the pressure change to determine the adjusted barometric pressure measure 142.

In some examples, such as shown in FIG. 1F, a third location 140 of the first client device 100 may be determined. In some examples, the first client device 100 may be indoors when the first barometric pressure measure and/or the adjusted barometric pressure measure 142 are determined. For example, the first client device 100 may be within a building corresponding to the polygon 110c. In some examples, it may be determined that the first client device 100 is indoors (e.g., within the building corresponding to the polygon 110c) based upon the third location 140 of the first client device 100 (e.g., the third location 140 of the first client device 100 may be compared with one or more polygons to determine that the first client device 100 is within an indoor space associated with a polygon, such as within the building corresponding to the polygon 110c). In an example in which the geofence (corresponding to the polygon 110c, for example) is generated, it may be determined that the first client device 100 is indoors (e.g., within the building corresponding to the polygon 110c) based upon the first client device 100 not having detected the first client device 100 crossing the geofence. Alternatively and/or additionally, the first client device 100 may be outdoors when the first barometric pressure measure and/or the adjusted barometric pressure measure 142 are determined.

In some examples, the altitude may correspond to at least one of a height of the first client device 100, an elevation of the first client device 100, a vertical distance between the first client device 100 and a reference point, etc. In an example, the reference point may correspond to at least one of sea level, ground level, etc.

FIG. 1G illustrates an exemplary scenario in which the altitude (shown with reference number 162) is determined based upon the adjusted barometric pressure measure 142 and/or a first barometric pressure value 154. The adjusted barometric pressure measure 142 may be determined when the first client device 100 is within a building 150 (e.g., a multi-floor building), such as corresponding to the polygon 110c. In some examples, the first barometric pressure value 154 may correspond to indoors pressure (e.g., a barometric pressure within an indoor space, such as a barometric pressure within the building 150). Alternatively and/or additionally, the first barometric pressure value 154 may correspond to ground level pressure (e.g., a barometric pressure at ground level 152). In some examples, the first barometric pressure value 154 may be received from one or more devices of the geographical system and/or the weather system. In an example, the first client device 100 may transmit a request for the first barometric pressure value 154 to the one or more devices. The request for the first barometric pressure value 154 may be indicative of a location (e.g., the third location 140) of the first client device 100. The one or more devices may determine the first barometric pressure value 154 based upon the location and/or the one or more devices may transmit the first barometric pressure value 154 to the first client device 100.

Alternatively and/or additionally, the first barometric pressure value 154 may be determined (by the first client device 100, for example) using the barometric sensor 102. For example, in response to detecting the first client device 100 entering and/or being within the building 150 (such as by monitoring a location of the first client device 100 and/or by comparing one or more locations of the first client device 100 with the polygon 110c), the first client device 100 may perform a barometric pressure measurement to determine a second barometric pressure measure. The first barometric pressure value 154 may be determined based upon the second barometric pressure measure and/or the first barometric offset 136. The barometric pressure measurement may be performed at a time at which at least one of a floor, an altitude, a level, etc. of the first client device 100 is known (by the first client device 100, for example). In an example, the barometric pressure measurement may be performed within a threshold duration of time from the first client device 100 entering the building 150. In some examples, by performing the barometric pressure measurement within the threshold duration of time from the first client device 100 entering the building 150, the first client device 100 may determine (e.g., know) that the barometric pressure measurement is performed when the first client device 100 is at a second altitude associated with an entrance 166 through which the first client device 100 entered the building 150 (such as based upon the threshold duration of time being less than a duration of time in which the first client device 100 would be moved to a floor different than a floor of the entrance 166). In an example, the second altitude may correspond to ground level 152 and/or other altitude (e.g., an altitude of the floor of the entrance 166, such as floor 1 in FIG. 1G).

In some examples, the altitude 162 may be determined based upon the adjusted barometric pressure measure 142 and/or the first barometric pressure value 154. In some examples, the altitude 162 may correspond to a vertical distance between the first client device 100 and a reference point, such as at least one of a location corresponding to the first barometric pressure value 154 (e.g., floor 1), ground level 152, sea level, etc.

FIG. 1H illustrates an exemplary scenario in which the altitude 162 is determined based upon the adjusted barometric pressure measure 142 and/or a second barometric pressure value 156. In some examples, the second barometric pressure value 156 may correspond to outdoors pressure (e.g., a barometric pressure of a space that is not within an indoor space). Alternatively and/or additionally, the second barometric pressure value 156 may correspond to ground level pressure (e.g., a barometric pressure at ground level 152). In some examples, the second barometric pressure value 156 may be based upon and/or the same as a surface pressure value. Alternatively and/or additionally, the second barometric pressure value 156 may be the same as and/or based upon a mean sea level pressure value. In some examples, information used to determine the second barometric pressure value 156 may be received from one or more devices of the geographical system and/or the weather system. In an example, the first client device 100 may transmit a request for the information to the one or more devices. The request for the information may be indicative of a location (e.g., the third location 140) of the first client device 100. The one or more devices may determine the information based upon the location and/or the one or more devices may transmit the information to the first client device 100. In some examples, the information may comprise at least one of the second barometric pressure value 156, the surface pressure value, the mean sea level pressure value, a first temperature 164 (e.g., an outdoors temperature associated with the location indicated by the request for the information), etc. Accordingly, the first client device 100 may determine the second barometric pressure value 156 based upon the information. The first client device 100 may determine a third barometric pressure value 158 based upon the second barometric pressure value 156, the first temperature 164 and/or a second temperature 160. The second temperature 160 may be an indoors temperature 160, such as a temperature within the building 150. The second temperature 160 may be determined using a temperature sensor. Alternatively and/or additionally, the second temperature 160 may be set to an indoor temperature that is stored on the first client device 100 (e.g., at least one of a standard indoor temperature, room temperature, a temperature between about 68° Fahrenheit to about 72° Fahrenheit, etc.). The third barometric pressure value 158 may be determined based upon the second barometric pressure value 156 and/or a temperature difference between outside the building 150 and inside the building 150 (e.g., the temperature difference may be determined based upon the first temperature 164 and the second temperature 160). In some examples, the altitude 162 may be determined based upon the adjusted barometric pressure measure 142 and/or the third barometric pressure value 158. In some examples, the altitude 162 may correspond to a vertical distance between the first client device 100 and a reference point, such as at least one of ground level 152, sea level, a location corresponding to the third barometric pressure value 158, etc.

FIG. 11 illustrates the first client device 100 transmitting reporting information 170 to a location tracking system 172, according to some embodiments. In some examples, the reporting information 170 comprises the altitude 162, the third location 140 and/or the adjusted barometric pressure measure 142. In some examples, the location tracking system 172 may determine a floor (of the building 150, for example) that the first client device 100 is located on based upon the reporting information 170. For example, the location tracking system 172 may determine the building 150 within which the first client device 100 is located based upon the third location 140. Alternatively and/or additionally, the location tracking system 172 may access building information (e.g., a blueprint, structural information, etc.) associated with the building 150. The location tracking system 172 may determine the floor based upon the building information and/or the altitude 162 (and/or the adjusted barometric pressure measure 142).

In some examples, the location tracking system 172 may track a location of the first client device 100 and/or the floor on which the first client device 100 is located. In some examples, the location tracking system 172 may determine locating information based upon the reporting information 170. For example, the locating information may be indicative of the floor. Alternatively and/or additionally, the locating information may be indicative of a location, within the floor, at which the first client device 100 is located. For example, the locating information may comprise a representation of the floor (such as a floor map showing boundaries of one or more areas, such as one or more rooms and/or units of the floor), wherein the representation of the floor comprises an indication of the location of the first client device 100.

In some examples, the location tracking system 172 may present (e.g., display) the locating information via an interface (e.g., a graphical user interface (GUI)). The locating information may be used to determine the floor on which the first client device 100 is located and/or a part of the floor (e.g., a room, a section and/or a unit of the floor) in which the first client device 100 is located.

In some examples, such as where the first client device 100 is coupled to an item, the locating information may be used to determine the floor and/or the part of the floor to locate the item. For example, the item may be located and/or retrieved using the locating information.

Alternatively and/or additionally, in some examples, such as where the first client device 100 belongs to and/or is carried and/or used by a person, the locating information may be used to determine the floor and/or the part of the floor to locate the person. For example, the person may be located using the locating information. In some examples, the locating information may be used by one or more entities, such as at least one of one or more guardians of the person, one or more users having authorization to the locating information, one or more first responders, etc.

In an example, the one or more first responders may use the locating information to locate the person and/or perform a rescue operation, such as where an emergency associated with the person is identified. The one or more first responders may be provided with the locating information, and/or may use the locating information to perform the rescue operation. FIG. 1J illustrates the location tracking system 172 transmitting the locating information (shown with reference number 176 in FIG. 1J) to a first responder management device 178, according to some embodiments. In some examples, the first responder management device 178 may provide one or more first responders (and/or one or more devices associated with the one or more first responders) with the locating information 176 such that the one or more first responders can perform the rescue operation, such as by assisting the person (and/or one or more other people) on the floor (such as where the person and/or the one or more other people are trapped on the floor). Alternatively and/or additionally, the location tracking system 172 may generate and/or transmit instructions to the first client device 100. The instructions may be indicative of actions the person may take for safety. Alternatively and/or additionally, the instructions may be indicative of at least one directions for exiting the building, directions to one or more first responders that may assist the person, at least some of the locating information 176, etc.

In some examples, the first barometric measurement may be performed, the adjusted barometric pressure measure 142 and/or the altitude 162 may be determined, and/or the reporting information 170 may be transmitted to the location tracking system 172 in response to a trigger event. In some examples, the trigger event may comprise receiving a request for the reporting information 170 (from the location tracking system 172 and/or other system, for example). Alternatively and/or additionally, the trigger event may correspond to an emergency event (such as an event in which a rescue operation may be performed to assist the person and/or one or more other people) detected by the first client device 100 and/or the location tracking system 172. In an example, the emergency event may be detected based upon an input received via the first client device 100, such as one or more selections of one or more selectable inputs corresponding to the emergency event, a call (e.g., at least one of a telephone call, a video call, a (Voice Over Internet Protocol) call, etc.) being placed to an emergency service (e.g., 911, enhanced 911 and/or other emergency service), a message being sent to an emergency service, etc.

In some examples, after performing the first calibration process and/or determining the first barometric offset 136, the first client device 100 may determine (periodically, for example) whether the one or more first conditions for performing a calibration process associated with the barometric sensor 102 are met. In an example in which the geofence (corresponding to the polygon 110c, for example) is generated, the first client device 100 may not determine whether the one or more first conditions are met before detecting the first client device 100 crossing the geofence (e.g., it may be determined and/or assumed that the first client device 100 is indoors, such as within the building corresponding to the polygon 110c, until the first client device 100 crossing the geofence is detected), which may provide for a reduction in power consumption of the first client device 100 (e.g., as a result of the first client device 100 not performing operations to determine whether the one or more first conditions are met before the first client device 100 crosses the geofence).

In some examples, the first client device 100 may have one or more functionalities, one or more computing programs and/or data of the location tracking system 172. Alternatively and/or additionally, the location tracking system 172 may be implemented by the first client device 100. Alternatively and/or additionally, some and/or all operations performed by the location tracking system 172 as provided herein may be performed by the first client device 100, in accordance with some embodiments. Alternatively and/or additionally, some and/or all operations performed by the first client device 100 as provided herein may be performed by the location tracking system 172, in accordance with some embodiments.

According to some embodiments, a method is provided. The method includes determining a first location of a device; determining, based upon the first location, that the device is outdoors; and responsive to determining that the device is outdoors, performing a calibration process associated with a barometric sensor of the device, wherein the calibration process includes: performing barometric measurements using the barometric sensor to determine a plurality of barometric pressure measures; determining a plurality of locations of the device, wherein a location of the plurality of locations corresponds to a location at which a barometric measurement is performed using the barometric sensor to determine a barometric pressure measure of the plurality of barometric pressure measures; selecting, based upon the plurality of locations, one or more barometric pressure measures of the plurality of barometric pressure measures; and determining, based upon the one or more barometric pressure measures and one or more reference values, a barometric offset associated with barometric measurement using the barometric sensor. The method includes performing a first barometric measurement using the barometric sensor to determine a first barometric pressure measure, wherein an altitude of the device is determined based upon the first barometric pressure measure and the barometric offset.

According to some embodiments, the determining that the device is outdoors includes determining that a distance between the first location of the device and a polygon is larger than a threshold distance, wherein the polygon comprises a representation of geographical boundaries of an area comprising indoor space.

According to some embodiments, the threshold distance is based upon a location error of the device.

According to some embodiments, the method includes determining a speed of the device, wherein the calibration process is performed responsive to determining that the speed is less than a threshold speed.

According to some embodiments, the method includes determining that a distance between a second location of the device and a polygon is less than a first threshold distance, wherein the polygon comprises a representation of geographical boundaries of an area comprising indoor space; and responsive to determining that the distance between the second location and the polygon is less than the first threshold distance, analyzing the plurality of locations to select one or more locations of the plurality of locations based upon a determination that one or more distances between the one or more locations and the polygon is larger than a second threshold distance and are smaller than a third threshold distance, wherein the selecting the one or more barometric pressure measures is performed based upon a determination that the one or more barometric pressure measures are associated with the one or more locations.

According to some embodiments, the method includes determining that a distance between a second location of the device and a polygon is less than a first threshold distance, wherein the polygon comprises a representation of geographical boundaries of an area comprising indoor space; and responsive to determining that the distance between the second location and the polygon is less than the first threshold distance, analyzing the plurality of locations to select one or more locations of the plurality of locations based upon a determination that, among locations of the plurality of locations having distances to the polygon that are larger than a second threshold distance, the one or more locations are closest to the polygon, wherein the selecting the one or more barometric pressure measures is performed based upon a determination that the one or more barometric pressure measures are associated with the one or more locations.

According to some embodiments, the method includes receiving first polygon information associated with a first region comprising a second location of the device, wherein the first polygon information is indicative of one or more first polygons in the first region and a polygon of the one or more first polygons comprises a representation of geographical boundaries of an area comprising indoor space; storing the first polygon information on the device; and responsive to the determining the first location of the device, determining whether second polygon information associated with a second region comprising the first location is stored on the device.

According to some embodiments, the method includes responsive to determining that the second polygon information associated with the second region is stored on the device, comparing one or more second polygons indicated by the second polygon information with the first location of the device, wherein the determining that the device is outdoors is based upon the comparing the one or more second polygons with the first location.

According to some embodiments, the method includes responsive to determining that the second polygon information associated with the second region is not stored on the device, transmitting, to a GIS device, a request for the second polygon information; receiving the second polygon information; and comparing one or more second polygons indicated by the second polygon information with the first location of the device, wherein the determining that the device is outdoors is based upon the comparing the one or more second polygons with the first location.

According to some embodiments, the method includes performing, prior to the calibration process, a second calibration process to determine a second barometric offset associated with barometric measurement using the barometric sensor; and determining a validity of the second barometric offset based upon at least one of a first time at which the second calibration process is performed or a second location of the device when the second calibration process is performed, wherein the calibration process is performed responsive to a determination that the second barometric offset is invalid.

According to some embodiments, the determining the validity of the second barometric offset is performed at a second time; and the determination that the second barometric offset is invalid is based upon a determination that a duration of time between the first time and the second time exceeds a threshold duration of time.

According to some embodiments, the determination that the second barometric offset is invalid is based upon a determination that a distance between the first location and the second location is larger than a threshold distance.

According to some embodiments, the one or more reference values are based upon at least one of one or more mean sea level pressure values associated with the one or more locations or one or more sea level altitude values associated with the one or more locations.

According to some embodiments, the one or more reference values are based upon one or more surface pressure values associated with the one or more locations.

According to some embodiments, a non-transitory computer-readable medium, storing instructions that when executed perform operations, is provided. The operations include performing a calibration process associated with a barometric sensor of a device, wherein the calibration process includes performing one or more barometric measurements using the barometric sensor to determine one or more barometric pressure measures; determining one or more locations of the device, wherein a location of the one or more locations corresponds to a location at which a barometric measurement is performed using the barometric sensor to determine a barometric pressure measure of the one or more barometric pressure measures; and determining, based upon the one or more barometric pressure measures and one or more surface pressure values associated with the one or more locations, a barometric offset associated with barometric measurement using the barometric sensor. The operations include performing a first barometric measurement using the barometric sensor to determine a first barometric pressure measure, wherein at least one of an adjusted barometric pressure measure or an altitude of the device is determined based upon the first barometric pressure measure and the barometric offset.

According to some embodiments, the operations include determining a speed of the device, wherein the calibration process is performed responsive to determining that the speed is less than a threshold speed.

According to some embodiments, the operations include determining a first location of a device; and determining, based upon the first location, that the device is outdoors, wherein the calibration process is performed responsive to determining that the device is outdoors.

According to some embodiments, the determining that the device is outdoors includes determining that a distance between the first location of the device and a polygon is larger than a threshold distance, wherein the polygon comprises a representation of geographical boundaries of an area comprising indoor space.

According to some embodiments, a device is provided. The device comprises a processor coupled to memory, the processor configured to execute instructions to perform operations. The operations include determining a speed of the device; and responsive to determining that the speed is less than a threshold speed, performing a calibration process associated with a barometric sensor of the device, wherein the calibration process includes performing barometric measurements using the barometric sensor to determine a plurality of barometric pressure measures; determining a plurality of locations of the device, wherein a location of the plurality of locations corresponds to a location at which a barometric measurement is performed using the barometric sensor to determine a barometric pressure measure of the plurality of barometric pressure measures; selecting, based upon the plurality of locations, one or more barometric pressure measures of the plurality of barometric pressure measures; and determining, based upon the one or more barometric pressure measures and one or more reference values, a barometric offset associated with barometric measurement using the barometric sensor. The operations include performing a first barometric measurement using the barometric sensor to determine a first barometric pressure measure, wherein an altitude of the device is determined based upon the first barometric pressure measure and the barometric offset.

According to some embodiments, the operations include determining that a distance between a second location of the device and a polygon is less than a first threshold distance, wherein the polygon comprises a representation of geographical boundaries of an area comprising indoor space; and responsive to determining that the distance between the second location and the polygon is less than the first threshold distance, analyzing the plurality of locations to select one or more locations of the plurality of locations based upon a determination that, among locations of the plurality of locations having distances to the polygon that are larger than a second threshold distance, the one or more locations are closest to the polygon, wherein the selecting the one or more barometric pressure measures is performed based upon a determination that the one or more barometric pressure measures are associated with the one or more locations.

Figure 4:
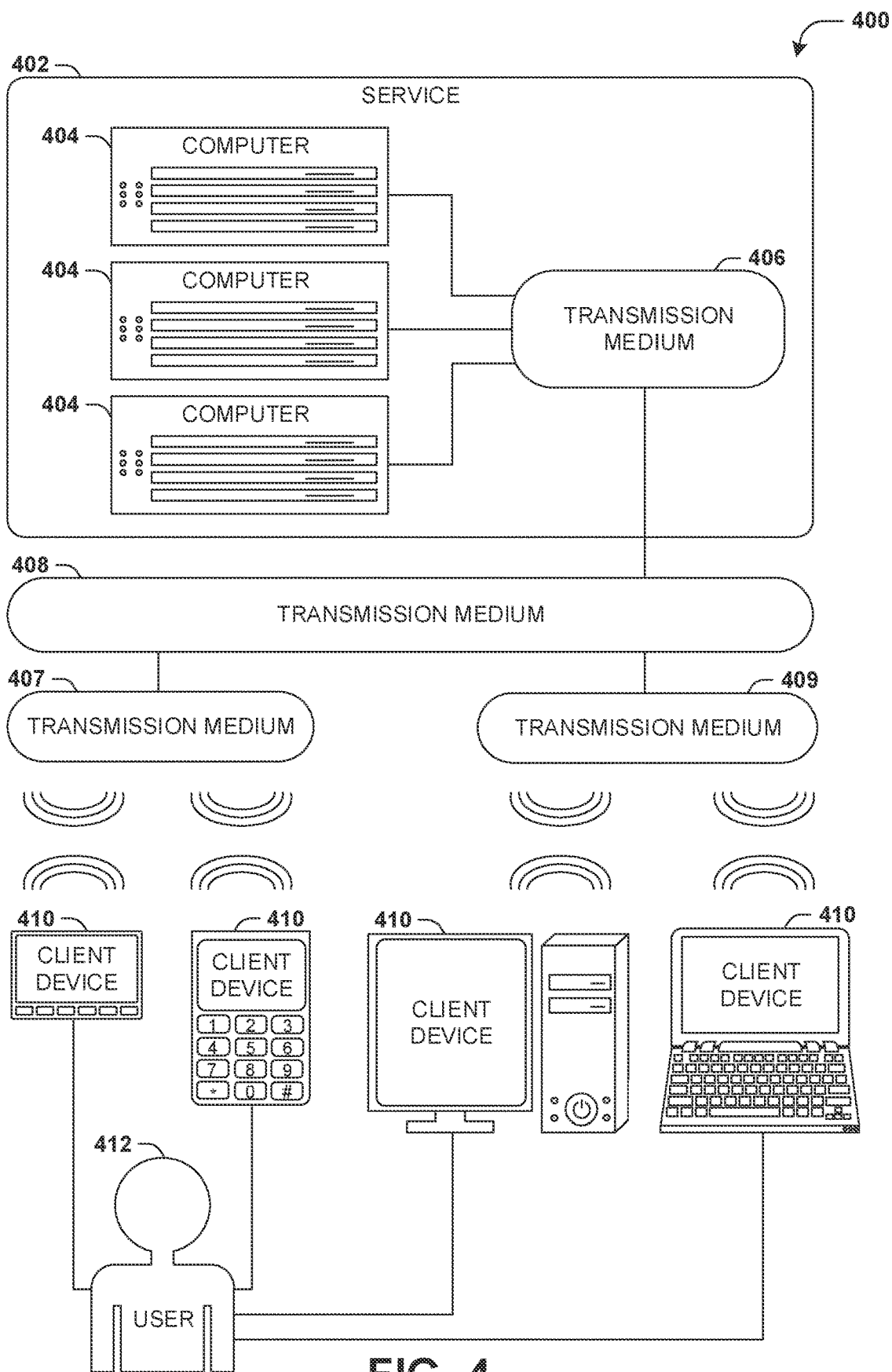
FIG. 4 is an illustration of a scenario involving various examples of transmission mediums that may be used to communicatively couple computers and clients.

FIG. 4 is an interaction diagram of a scenario 400 illustrating a service 402 provided by a set of computers 404 to a set of client devices 410 via various types of transmission mediums. The computers 404 and/or client devices 410 may be capable of transmitting, receiving, processing, and/or storing many types of signals, such as in memory as physical memory states.

The computers 404 of the service 402 may be communicatively coupled together, such as for exchange of communications using a transmission medium 406. The transmission medium 406 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 402.

Likewise, the transmission medium 406 may comprise one or more sub-networks, such as may employ different architectures, may be compliant or compatible with differing protocols and/or may interoperate within the transmission medium 406. Additionally, various types of transmission medium 406 may be interconnected (e.g., a router may provide a link between otherwise separate and independent transmission medium 406).

In scenario 400 of FIG. 4, the transmission medium 406 of the service 402 is connected to a transmission medium 408 that allows the service 402 to exchange data with other services 402 and/or client devices 410. The transmission medium 408 may encompass various combinations of devices with varying levels of distribution and exposure, such as a public wide-area network and/or a private network (e.g., a virtual private network (VPN) of a distributed enterprise).

In the scenario 400 of FIG. 4, the service 402 may be accessed via the transmission medium 408 by a user 412 of one or more client devices 410, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 410 may communicate with the service 402 via various communicative couplings to the transmission medium 408. As a first such example, one or more client devices 410 may comprise a cellular communicator and may communicate with the service 402 by connecting to the transmission medium 408 via a transmission medium 407 provided by a cellular provider. As a second such example, one or more client devices 410 may communicate with the service 402 by connecting to the transmission medium 408 via a transmission medium 409 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 404 and the client devices 410 may communicate over various types of transmission mediums.

Figure 5:
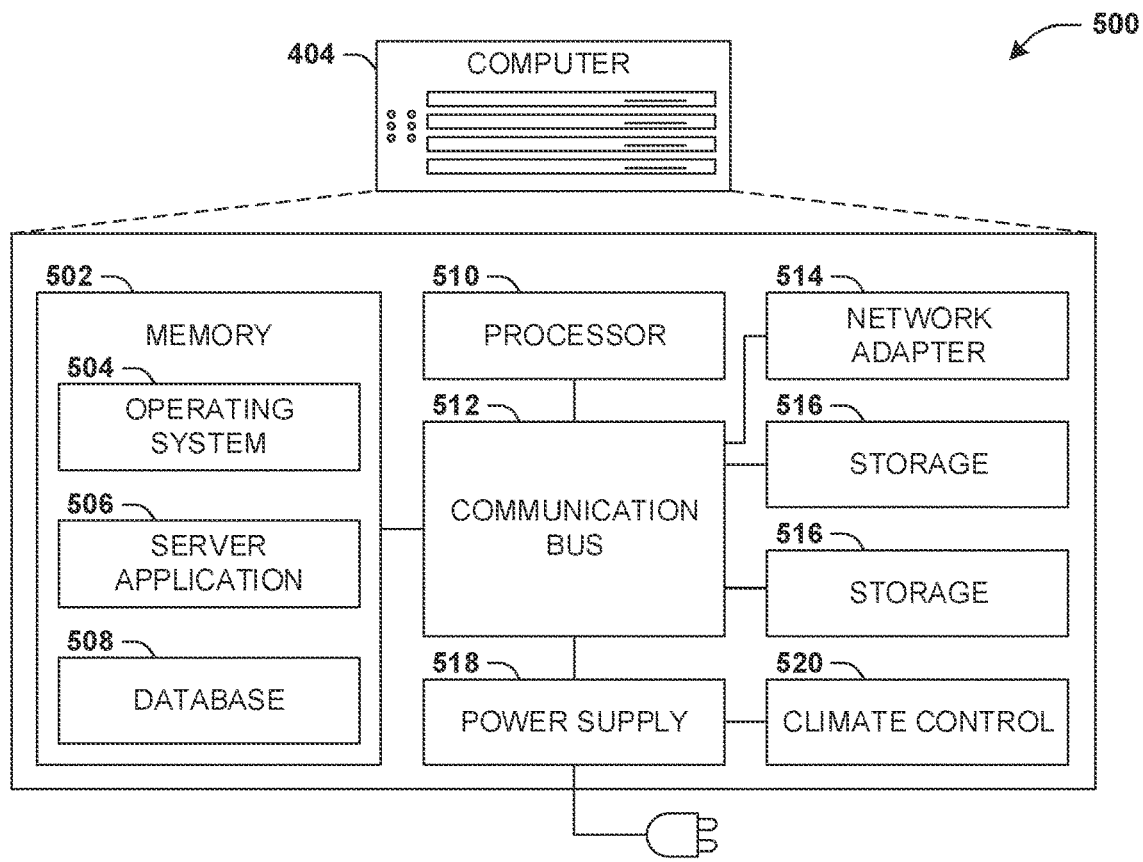
FIG. 5 is an illustration of a scenario involving an example configuration of a computer that may utilize and/or implement at least a portion of the techniques presented herein.

FIG. 5 presents a schematic architecture diagram 500 of a computer 404 that may utilize at least a portion of the techniques provided herein. Such a computer 404 may vary widely in configuration or capabilities, alone or in conjunction with other computers, in order to provide a service such as the service 402.

The computer 404 may comprise one or more processors 510 that process instructions. The one or more processors 510 may optionally include a plurality of cores; one or more coprocessors, such as a mathematics coprocessor or an integrated graphical processing unit (GPU); and/or one or more layers of local cache memory. The computer 404 may comprise memory 502 storing various forms of applications, such as an operating system 504; one or more computer applications 506; and/or various forms of data, such as a database 508 or a file system. The computer 404 may comprise a variety of peripheral components, such as a wired and/or wireless network adapter 514 connectible to a local area network and/or wide area network; one or more storage components 516, such as a hard disk drive, a solid-state storage device (SSD), a flash memory device, and/or a magnetic and/or optical disk reader.

The computer 404 may comprise a mainboard featuring one or more communication buses 512 that interconnect the processor 510, the memory 502, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 512 may interconnect the computer 404 with at least one other computer. Other components that may optionally be included with the computer 404 (though not shown in the schematic architecture diagram 500 of FIG. 5) include a display; a display adapter, such as a graphical processing unit (GPU); input peripherals, such as a keyboard and/or mouse; and a flash memory device that may store a basic input/output system (BIOS) routine that facilitates booting the computer 404 to a state of readiness.

The computer 404 may operate in various physical enclosures, such as a desktop or tower, and/or may be integrated with a display as an "all-in-one" device. The computer 404 may be mounted horizontally and/or in a cabinet or rack, and/or may simply comprise an interconnected set of components. The computer 404 may comprise a dedicated and/or shared power supply 518 that supplies and/or regulates power for the other components. The computer 404 may provide power to and/or receive power from another computer and/or other devices. The computer 404 may comprise a shared and/or dedicated climate control unit 520 that regulates climate properties, such as temperature, humidity, and/or airflow. Many such computers 404 may be configured and/or adapted to utilize at least a portion of the techniques presented herein.

Figure 6:
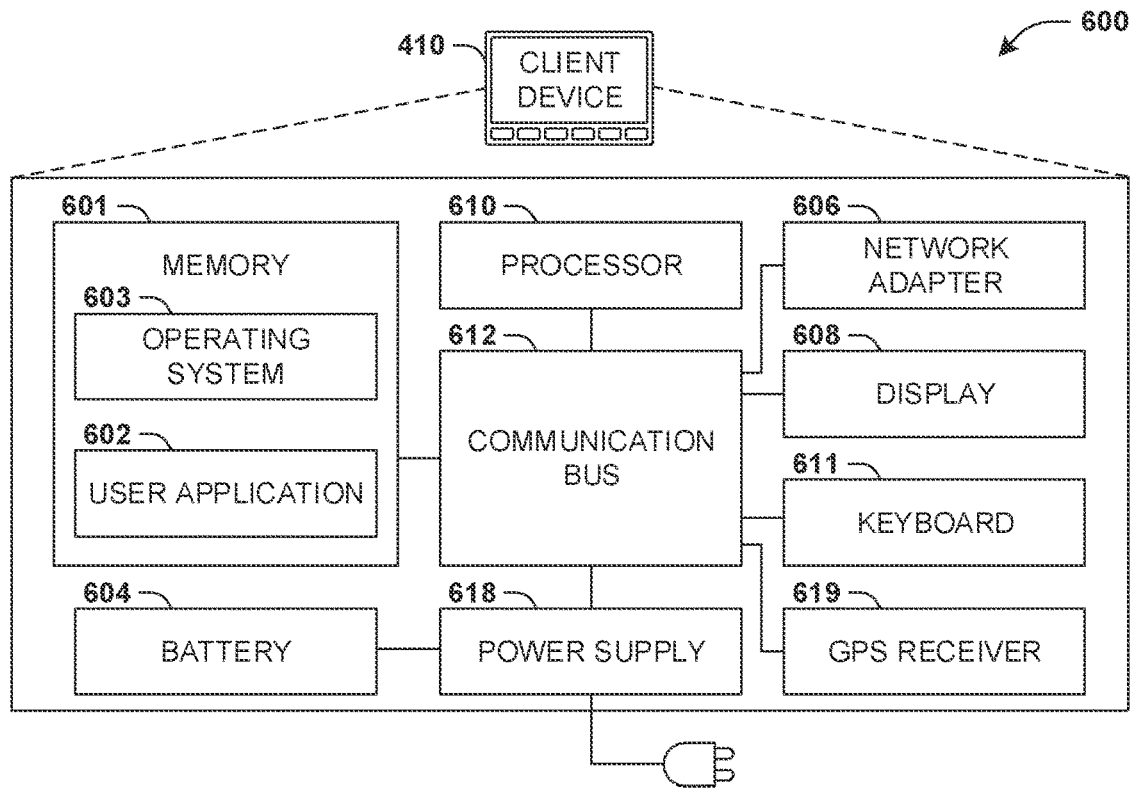
FIG. 6 is an illustration of a scenario involving an example configuration of a client that may utilize and/or implement at least a portion of the techniques presented herein.

FIG. 6 presents a schematic architecture diagram 600 of a client device 410 whereupon at least a portion of the techniques presented herein may be implemented. Such a client device 410 may vary widely in configuration or capabilities, in order to provide a variety of functionality to a user such as the user 412. The client device 410 may be provided in a variety of form factors, such as a desktop or tower workstation; an "all-in-one" device integrated with a display 608; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 410 may serve the user in a variety of roles, such as a workstation, kiosk, media player, gaming device, and/or appliance.

The client device 410 may comprise one or more processors 610 that process instructions. The one or more processors 610 may optionally include a plurality of cores; one or more coprocessors, such as a mathematics coprocessor or an integrated graphical processing unit (GPU); and/or one or more layers of local cache memory. The client device 410 may comprise memory 601 storing various forms of applications, such as an operating system 603; one or more user applications 602, such as document applications, media applications, file and/or data access applications, communication applications such as web browsers and/or email clients, utilities, and/or games; and/or drivers for various peripherals. The client device 410 may comprise a variety of peripheral components, such as a wired and/or wireless network adapter 606 connectible to a local area network and/or wide area network; one or more output components, such as a display 608 coupled with a display adapter (optionally including a graphical processing unit (GPU)), a sound adapter coupled with a speaker, and/or a printer; input devices for receiving input from the user, such as a keyboard 611, a mouse, a microphone, a camera, and/or a touch-sensitive component of the display 608; and/or environmental sensors, such as a global positioning system (GPS) receiver 619 that detects the location, velocity, and/or acceleration of the client device 410, a compass, accelerometer, and/or gyroscope that detects a physical orientation of the client device 410. Other components that may optionally be included with the client device 410 (though not shown in the schematic architecture diagram 600 of FIG. 6) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 410 to a state of readiness; and a climate control unit that regulates climate properties, such as temperature, humidity, and airflow.

The client device 410 may comprise a mainboard featuring one or more communication buses 612 that interconnect the processor 610, the memory 601, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 410 may comprise a dedicated and/or shared power supply 618 that supplies and/or regulates power for other components, and/or a battery 604 that stores power for use while the client device 410 is not connected to a power source via the power supply 618. The client device 410 may provide power to and/or receive power from other client devices.

Figure 7:
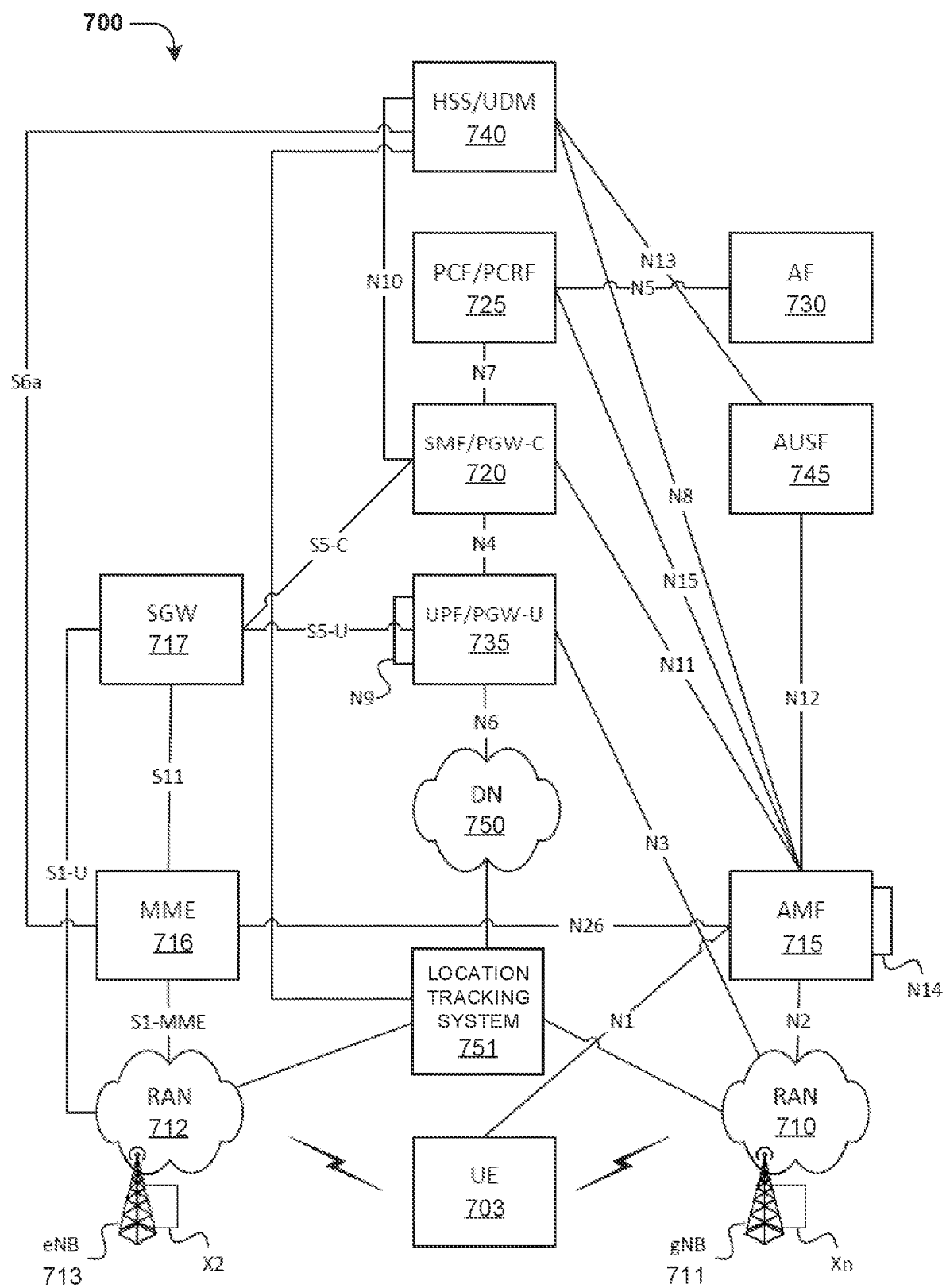
FIG. 7 is an illustration of an example environment in which at least a portion of the techniques presented herein may be utilized and/or implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include UE 703, RAN 710 (which may include one or more Next Generation Node Bs ("gNBs") 711), RAN 712 (which may include one or more one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Home Subscriber Server ("HSS")/Unified Data Management ("UDM") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as location tracking system 751.

The example shown in FIG. 7 illustrates one instance of each network component or function (e.g., one instance of SMF/PGW-C 720, PCF/PCRF 725, UPF/PGW-U 735, HSS/UDM 740, and/or 745). In practice, environment 700 may include multiple instances of such components or functions. For example, in some embodiments, environment 700 may include multiple "slices" of a core network, where each slice includes a discrete set of network functions (e.g., one slice may include a first instance of SMF/PGW-C 720, PCF/PCRF 725, UPF/PGW-U 735, HSS/UDM 740, and/or 745, while another slice may include a second instance of SMF/PGW-C 720, PCF/PCRF 725, UPF/PGW-U 735, HSS/UDM 740, and/or 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively and/or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 703 may include a computation and communication device, such as a wireless mobile communication device that is capable of communicating with RAN 710, RAN 712, and/or DN 750. UE 703 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 703 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 703 may communicate with one or more other elements of environment 700. UE 703 may communicate with RAN 710 via an air interface (e.g., as provided by gNB 711). For instance, RAN 710 may receive traffic (e.g., voice call traffic, data traffic, messaging traffic, signaling traffic, etc.) from UE 703 via the air interface, and may communicate the traffic to UPF/PGW-U 735, and/or one or more other devices or networks. Similarly, RAN 710 may receive traffic intended for UE 703 (e.g., from UPF/PGW-U 735, AMF 715, and/or one or more other devices or networks) and may communicate the traffic to UE 703 via the air interface.

RAN 712 may be, or may include, a LTE RAN that includes one or more base stations (e.g., one or more eNBs 713), via which UE 703 may communicate with one or more other elements of environment 700. UE 703 may communicate with RAN 712 via an air interface (e.g., as provided by eNB 713). For instance, RAN 710 may receive traffic (e.g., voice call traffic, data traffic, messaging traffic, signaling traffic, etc.) from UE 703 via the air interface, and may communicate the traffic to UPF/PGW-U 735, and/or one or more other devices or networks. Similarly, RAN 710 may receive traffic intended for UE 703 (e.g., from UPF/PGW-U 735, SGW 717, and/or one or more other devices or networks) and may communicate the traffic to UE 703 via the air interface.

AMF 715 may include one or more devices, systems, Virtualized Network Functions ("VNFs"), etc., that perform operations to register UE 703 with the 5G network, to establish bearer channels associated with a session with UE 703, to hand off UE 703 from the 5G network to another network, to hand off UE 703 from the other network to the 5G network, manage mobility of UE 703 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, etc., that perform operations to register UE 703 with the EPC, to establish bearer channels associated with a session with UE 703, to hand off UE 703 from the EPC to another network, to hand off UE 703 from another network to the EPC, manage mobility of UE 703 between RANs 712 and/or eNBs 713, and/or to perform other operations.

SGW 717 may include one or more devices, systems, VNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, etc., that gather, process, store, and/or provide information in a manner described herein. SMF/PGW-C 720 may, for example, facilitate in the establishment of communication sessions on behalf of UE 703. In some embodiments, the establishment of communications sessions may be performed in accordance with one or more policies provided by PCF/PCRF 725.

PCF/PCRF 725 may include one or more devices, systems, VNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, etc., that receive, store, and/or provide information that may be used in determining parameters (e.g., quality of service parameters, charging parameters, or the like) for certain applications.

UPF/PGW-U 735 may include one or more devices, systems, VNFs, etc., that receive, store, and/or provide data (e.g., user plane data). For example, UPF/PGW-U 735 may receive user plane data (e.g., voice call traffic, data traffic, etc.), destined for UE 703, from DN 750, and may forward the user plane data toward UE 703 (e.g., via RAN 710, SMF/PGW-C 720, and/or one or more other devices). In some embodiments, multiple UPFs 735 may be deployed (e.g., in different geographical locations), and the delivery of content to UE 703 may be coordinated via the N9 interface (e.g., as denoted in FIG. 7 by the line marked "N9" originating and terminating at UPF/PGW-U 735). Similarly, UPF/PGW-U 735 may receive traffic from UE 703 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

HSS/UDM 740 and AUSF 745 may include one or more devices, systems, VNFs, etc., that manage, update, and/or store, in one or more memory devices associated with AUSF 745 and/or HSS/UDM 740, profile information associated with a subscriber. AUSF 745 and/or HSS/UDM 740 may perform authentication, authorization, and/or accounting operations associated with the subscriber and/or a communication session with UE 703.

DN 750 may include one or more wired and/or wireless networks.

For example, DN 750 may include an Internet Protocol ("IP")-based PDN, a wide area network ("WAN") such as the Internet, a private enterprise network, and/or one or more other networks. UE 703 may communicate, through DN 750, with data servers, other UEs UE 703, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 703 may communicate.

The location tracking system 751 may include one or more devices, systems, VNFs, etc., that perform one or more operations described herein. For example, the location tracking system 751 may receive reporting information from the UE 703 (e.g., the first client device 100) and/or determine, based upon the reporting information, locating information (indicative of a building in which the UE 703 is located, a floor of the building on which the UE 703 is located and/or a part of the floor in which the UE 703 is located, for example). The location tracking system 751 may present the locating information via an interface and/or transmit the locating information to one or more devices, such as at least one of the UE 703, a first responder management device, etc.

Figure 8:
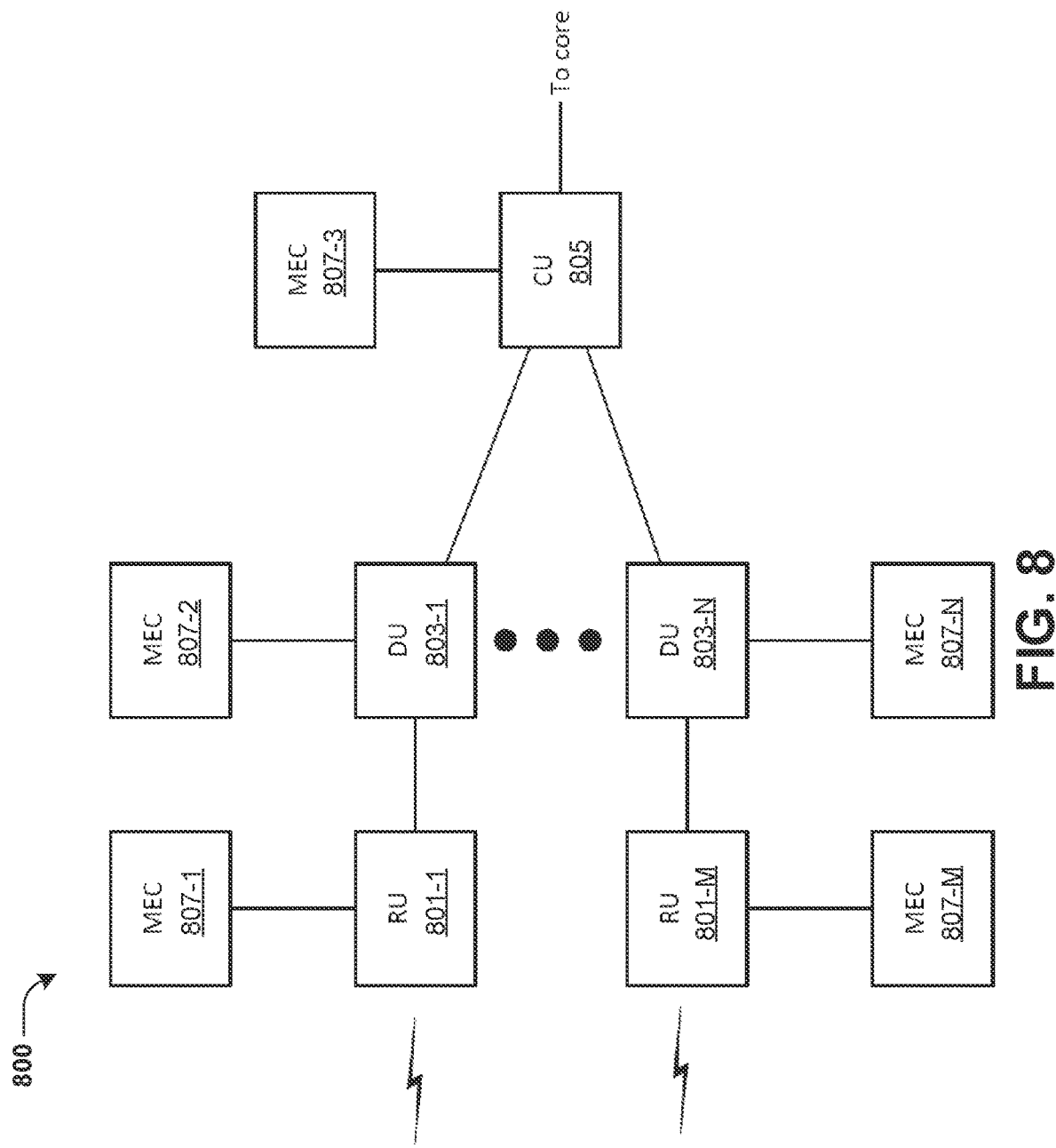
FIG. 8 is an illustration of an example network that may utilize and/or implement at least a portion of the techniques presented herein.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs UE 703 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based upon the RLC packets) on the traffic received from DUs 803.

In accordance with some embodiments, CU 805 may receive downlink traffic (e.g., traffic from the core network) for a particular UE 703, and may determine which DU(s) 803 should receive the downlink traffic. DU 803 may include one or more devices that transmit traffic between a core network (e.g., via CU 805) and UE 703 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 703.

RU 801 may include hardware circuitry (e.g., one or more RF transceivers, antennas, radios, and/or other suitable hardware) to communicate wirelessly (e.g., via an RF interface) with one or more UEs UE 703, one or more other DUs 803 (e.g., via RUs 801 associated with DUs 803), and/or any other suitable type of device. In the uplink direction, RU 801 may receive traffic from UE 703 and/or another DU 803 via the RF interface and may provide the traffic to DU 803. In the downlink direction, RU 801 may receive traffic from DU 803, and may provide the traffic to UE 703 and/or another DU 803.

RUs 801 may, in some embodiments, be communicatively coupled to one or more Multi-Access/Mobile Edge Computing ("MEC") devices, referred to sometimes herein simply as ("MECs") 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 703, via a respective RU 801.

For example, RU 801-1 may route some traffic, from UE 703, to MEC 807-1 instead of to a core network (e.g., via DU 803 and CU 805). MEC 807-1 may process the traffic, perform one or more computations based upon the received traffic, and may provide traffic to UE 703 via RU 801-1. In this manner, ultra-low latency services may be provided to UE 703, as traffic does not need to traverse DU 803, CU 805, and an intervening backhaul network between DU network 800 and the core network. In some embodiments, MEC 807 may include, and/or may implement some or all of the functionality described above with respect to at least one of the location tracking system 751, the location tracking system 172, one or more GIS devices, the geographical system, the weather system, etc.

Figure 9:
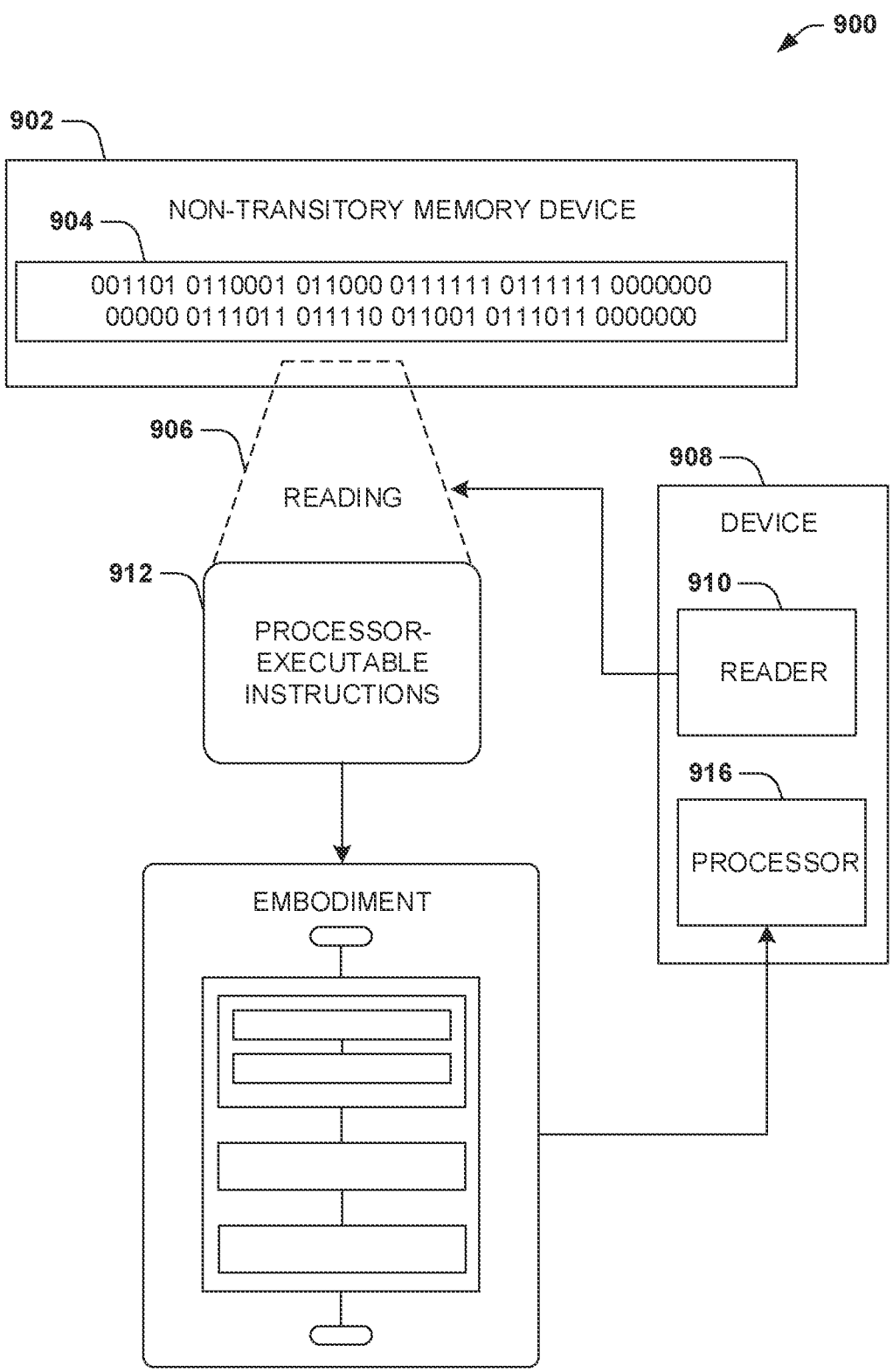
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 200 of FIG. 2, for example. In some embodiments, the processor-executable instructions 912 are configured to cause implementation of a system, such as at least some of the example system 101 of FIGS. 1A-1J, for example.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   determining a first location of a device;
   determining, based upon the first location, that the device is outdoors;
   responsive to determining that the device is outdoors, performing a calibration process associated with a barometric sensor of the device, wherein the calibration process comprises:
      performing barometric measurements using the barometric sensor to determine a plurality of barometric pressure measures;
      determining a plurality of locations of the device, wherein a location of the plurality of locations corresponds to a location at which a barometric measurement is performed using the barometric sensor to determine a barometric pressure measure of the plurality of barometric pressure measures;
      determining that a distance between a second location of the device and a polygon is less than a first threshold distance, wherein the polygon comprises a representation of geographical boundaries of an area comprising indoor space;
      responsive to determining that the distance between the second location and the polygon is less than the first threshold distance, analyzing the plurality of locations to select one or more locations of the plurality of locations based upon a determination that, among locations of the plurality of locations having distances to the polygon that are larger than a second threshold distance, at least one of:
         the one or more locations have distances to the polygon that are less than a third threshold distance, or
         the one or more locations are closest to the polygon;
      selecting one or more barometric pressure measures of the plurality of barometric pressure measures based upon a determination that the one or more barometric pressure measures are associated with the one or more locations; and
      determining, based upon the selected one or more barometric pressure measures and one or more reference values, a barometric offset associated with barometric measurement using the barometric sensor; and
   performing a first barometric measurement using the barometric sensor to determine a first barometric pressure measure, wherein an altitude of the device is determined based upon the first barometric pressure measure and the barometric offset.

2. The method of claim 1, wherein the determining that the device is outdoors comprises:
   determining that a distance between the first location of the device and a polygon is larger than a threshold distance, wherein the polygon comprises a representation of geographical boundaries of an area comprising indoor space.

3. The method of claim 2, wherein:
   the threshold distance is based upon a location error of the device.

4. The method of claim 1, comprising:
   determining a speed of the device, wherein the calibration process is performed responsive to determining that the speed is less than a threshold speed.

5. The method of claim 1, comprising:
   determining a speed of the device, wherein the calibration process is performed responsive to determining that the speed exceeds a threshold speed.

6. The method of claim 1, wherein:
   the one or more reference values are based upon at least one of one or more mean sea level pressure values associated with locations of the plurality of locations or one or more sea level altitude values associated with the locations.

7. The method of claim 1, wherein:
   the one or more reference values are based upon one or more surface pressure values associated with locations of the plurality of locations.

8. A method, comprising:
   determining a first location of a device;
   determining, based upon the first location, that the device is outdoors;
   responsive to determining that the device is outdoors, performing a calibration process associated with a barometric sensor of the device, wherein the calibration process comprises:
      performing barometric measurements using the barometric sensor to determine a plurality of barometric pressure measures;
      determining a plurality of locations of the device, wherein a location of the plurality of locations corresponds to a location at which a barometric measurement is performed using the barometric sensor to determine a barometric pressure measure of the plurality of barometric pressure measures;
      selecting, based upon the plurality of locations, one or more barometric pressure measures of the plurality of barometric pressure measures; and
      determining, based upon the selected one or more barometric pressure measures and one or more reference values, a barometric offset associated with barometric measurement using the barometric sensor;
   performing a first barometric measurement using the barometric sensor to determine a first barometric pressure measure, wherein an altitude of the device is determined based upon the first barometric pressure measure and the barometric offset;

receiving first polygon information associated with a first region comprising a second location of the device, wherein:

the first polygon information is indicative of one or more first polygons in the first region; and a polygon of the one or more first polygons comprises a representation of geographical boundaries of an area comprising indoor space;

storing the first polygon information on the device; and responsive to the determining the first location of the device, determining whether second polygon information associated with a second region comprising the first location is stored on the device.

9. The method of claim 8, comprising:

responsive to determining that the second polygon information associated with the second region is stored on the device, comparing one or more second polygons indicated by the second polygon information with the first location of the device, wherein the determining that the device is outdoors is based upon the comparing the one or more second polygons with the first location.

10. The method of claim 8, comprising:

responsive to determining that the second polygon information associated with the second region is not stored on the device, transmitting, to a geographic information system (GIS) device, a request for the second polygon information;

receiving the second polygon information; and comparing one or more second polygons indicated by the second polygon information with the first location of the device, wherein the determining that the device is outdoors is based upon the comparing the one or more second polygons with the first location.

11. The method of claim 8, wherein:

the one or more reference values are based upon at least one of one or more mean sea level pressure values associated with locations of the plurality of locations or one or more sea level altitude values associated with the locations.

12. The method of claim 8, wherein:

the one or more reference values are based upon one or more surface pressure values associated with locations of the plurality of locations.

13. A method, comprising:

performing a calibration process to determine a barometric offset associated with barometric measurement using a barometric sensor;

determining a validity of the barometric offset based upon at least one of a first time at which the calibration process is performed or a location of a device when the calibration process is performed;

responsive to determining that the barometric offset is invalid, performing a second calibration process associated with a barometric sensor of the device, wherein the second calibration process comprises:

performing barometric measurements using the barometric sensor to determine a plurality of barometric pressure measures;

determining a plurality of locations of the device, wherein a second location of the plurality of locations corresponds to a location at which a barometric measurement is performed using the barometric sensor to determine a barometric pressure measure of the plurality of barometric pressure measures;

selecting, based upon the plurality of locations, one or more barometric pressure measures of the plurality of barometric pressure measures; and determining, based upon the selected one or more barometric pressure measures and one or more reference values, a second barometric offset associated with barometric measurement using the barometric sensor; and performing a first barometric measurement using the barometric sensor to determine a first barometric pressure measure, wherein an altitude of the device is determined based upon the first barometric pressure measure and the second barometric offset.

14. The method of claim 13, wherein:

the determining the validity of the barometric offset is performed at a second time; and the determination that the barometric offset is invalid is based upon a determination that a duration of time between the first time and the second time exceeds a threshold duration of time.

15. The method of claim 13, wherein:

the determination that the barometric offset is invalid is based upon a determination that a distance between a first location associated with performance of the second calibration process and the second location is larger than a threshold distance.

16. The method of claim 13, wherein:

the one or more reference values are based upon at least one of one or more mean sea level pressure values associated with locations of the plurality of locations or one or more sea level altitude values associated with the locations.

17. The method of claim 13, wherein:

the one or more reference values are based upon one or more surface pressure values associated with locations of the plurality of locations.

18. A device comprising:

a processor coupled to memory, the processor configured to execute instructions to perform operations comprising:

determining a speed of the device;

responsive to determining that the speed is less than a threshold speed, performing a calibration process associated with a barometric sensor of the device, wherein the calibration process comprises:

performing barometric measurements using the barometric sensor to determine a plurality of barometric pressure measures;

determining a plurality of locations of the device, wherein a location of the plurality of locations corresponds to a location at which a barometric measurement is performed using the barometric sensor to determine a barometric pressure measure of the plurality of barometric pressure measures;

determining that a distance between a second location of the device and a polygon is less than a first threshold distance, wherein the polygon comprises a representation of geographical boundaries of an area comprising indoor space;

responsive to determining that the distance between the second location and the polygon is less than the first threshold distance, analyzing the plurality of locations to select one or more locations of the plurality of locations based upon a determination that, among locations of the plurality of locations having distances to the polygon that are larger than a second threshold distance, at least one of:

the one or more locations have distances to the polygon that are less than a third threshold distance, or the one or more locations are closest to the polygon;

selecting one or more barometric pressure measures of the plurality of barometric pressure measures based upon a determination that the one or more barometric pressure measures are associated with the one or more locations; and determining, based upon the selected one or more barometric pressure measures and one or more reference values, a barometric offset associated with barometric measurement using the barometric sensor; and performing a first barometric measurement using the barometric sensor to determine a first barometric pressure measure, wherein an altitude of the device is determined based upon the first barometric pressure measure and the barometric offset.

19. The device of claim 18, wherein the calibration process is performed responsive to further determining that the speed exceeds a second threshold speed.

20. The device of claim 18, wherein at least one of:

the one or more reference values are based upon at least one of one or more mean sea level pressure values associated with locations of the plurality of locations or one or more sea level altitude values associated with the locations; or the one or more reference values are based upon one or more surface pressure values associated with the locations of the plurality of locations.

* * * * *